(12) United States Patent
Gillard

(10) Patent No.: US 10,091,277 B2
(45) Date of Patent: Oct. 2, 2018

(54) METHOD, SERVER, CLIENT AND SOFTWARE FOR IMAGE PROCESSING

(71) Applicant: Sony Corporation, Minato-ku (JP)

(72) Inventor: Clive Henry Gillard, Alton (GB)

(73) Assignee: SONY CORPORATION, Tokyo (JP)

( * ) Notice: Subject to any disclaimer, the term of this patent is extended or adjusted under 35 U.S.C. 154(b) by 239 days.

(21) Appl. No.: 14/535,712

(22) Filed: Nov. 7, 2014

(65) Prior Publication Data

US 2015/0142875 A1     May 21, 2015

(30) Foreign Application Priority Data

Nov. 15, 2013    (GB) .................................. 1320217.1

(51) Int. Cl.
| | |
|---|---|
| *G06F 15/16* | (2006.01) |
| *H04L 29/08* | (2006.01) |
| *H04N 21/2343* | (2011.01) |
| *H04N 21/4728* | (2011.01) |
| *H04N 21/643* | (2011.01) |
| *H04N 21/6587* | (2011.01) |

(Continued)

(52) U.S. Cl.
CPC .......... *H04L 67/10* (2013.01); *H04L 65/604* (2013.01); *H04L 67/42* (2013.01); *H04N 21/2393* (2013.01); *H04N 21/234327* (2013.01); *H04N 21/25891* (2013.01); *H04N 21/274* (2013.01); *H04N 21/433* (2013.01); *H04N 21/437* (2013.01); *H04N 21/440245* (2013.01); *H04N 21/4728* (2013.01); *H04N 21/47205* (2013.01); *H04N 21/64322* (2013.01); *H04N 21/6587* (2013.01)

(58) Field of Classification Search
CPC ....................................................... H04L 67/10
USPC ............................................................ 709/203
See application file for complete search history.

(56) References Cited

U.S. PATENT DOCUMENTS

| | | | |
|---|---|---|---|
| 6,532,311 B1 * | 3/2003 | Pritt .................. | G06F 17/30274 358/403 |
| 6,859,557 B1 | 2/2005 | Uyttendaele et al. | |

(Continued)

FOREIGN PATENT DOCUMENTS

| | | |
|---|---|---|
| WO | WO 00/08889 | 2/2000 |
| WO | WO 2004/079630 A2 | 9/2004 |

(Continued)

OTHER PUBLICATIONS

U.S. Appl. No. 14/520,438, filed Oct. 22, 2014, Michael J. Williams et al.
U.S. Appl. No. 14/794,255, filed Jul. 8, 2015, Gillard.

*Primary Examiner* — Jason D Recek
(74) *Attorney, Agent, or Firm* — Oblon, McClelland, Maier & Neustadt, L.L.P.

(57) ABSTRACT

A client device is disclosed. The client device comprises: a communication unit configured to receive a plurality of parameters, the parameters defining segments of an image stored on a server, wherein the segments do not overlap; a processing unit configured to allow selection of a segment of the image in accordance with a defined view on the client device and wherein upon selection the segment and an adjacent segment are downloadable from the server; a plurality of the decoders operable to decode the segment and the adjacent segment and a display configured to display on the client device the cut out of the image taken from the segment.

19 Claims, 35 Drawing Sheets

(51) Int. Cl.
  *H04L 29/06*      (2006.01)
  *H04N 21/239*     (2011.01)
  *H04N 21/258*     (2011.01)
  *H04N 21/274*     (2011.01)
  *H04N 21/433*     (2011.01)
  *H04N 21/437*     (2011.01)
  *H04N 21/4402*    (2011.01)
  *H04N 21/472*     (2011.01)

(56) References Cited

U.S. PATENT DOCUMENTS

| | | | | |
|---|---|---|---|---|
| 7,660,352 B2* | 2/2010 | Yamane | ............... | H04N 19/89 375/240.12 |
| 2004/0175059 A1* | 9/2004 | Willner | ............ | G06F 17/30274 382/305 |
| 2010/0060547 A1* | 3/2010 | Bloebaum | ............ | G06F 1/1624 345/1.3 |
| 2010/0166052 A1* | 7/2010 | Okuda | ................ | H04N 19/91 375/240 |
| 2010/0195922 A1* | 8/2010 | Amano | ............... | H04N 19/176 382/233 |
| 2011/0060766 A1* | 3/2011 | Ehlke | ................... | G06F 3/0481 707/802 |
| 2013/0188723 A1* | 7/2013 | Tanaka | ................ | H04N 19/176 375/240.16 |
| 2014/0003531 A1* | 1/2014 | Coban | ................... | H04N 19/70 375/240.24 |
| 2015/0015789 A1* | 1/2015 | Guntur | ................ | H04N 5/4401 348/581 |

FOREIGN PATENT DOCUMENTS

WO   WO 2007/035065 A1   3/2007
WO   WO 2008/073674 A1   6/2008

* cited by examiner

| Video File | URL |
|---|---|
| TileA1:time1.mp4 | www.video.com/tileA1:time1.mp4 |
| TileA1:time2.mp4 | ⋮ |
| ⋮ | ⋮ |
| TileA2:time1.mp4 | ⋮ |
| TileA2:time2.mp4 | ⋮ |
| ⋮ | ⋮ |
| TileB2:time1.mp4 | ⋮ |
| ⋮ | ⋮ |
| TileB3:time1.mp4 | ⋮ |
| ⋮ | ⋮ |
| TileNn:time1.mp4 | ⋮ |
| ⋮ | ⋮ |
| TileNn:timen.mp4 | www.video.com/tileNn:timen.mp4 |

FIG. 10

| Zoom, pitch, yaw | Tile | URL |
|---|---|---|
| (1.0, 0°, 0°) | A1 | www.video.com/tileA1:<INSERT-TIME>.MP4 |
| (2.3, 0°, -20°) | A2 | www.video.com/tileA2:<INSERT-TIME>.MP4 |
| (2.3, 0, +20°) | B2 | www.video.com/tileB2:<INSERT-TIME>.MP4 |
| (3.5, +0.5°, -20°) | A3 | ⋮ |
| (3.5, +0.5°, +20°) | F3 | www.video.com/tileF3:<INSERT-TIME>.MP4 |

FIG. 11

METHOD, SERVER, CLIENT AND SOFTWARE FOR IMAGE PROCESSING

CROSS REFERENCE TO RELATED APPLICATIONS

The present application claims priority to United Kingdom application GB1320217.1 filed on 15 Nov. 2013, the contents of which being incorporated herein by reference in its entirety.

BACKGROUND

Field of the Disclosure

The present disclosure relates to a method, server, client and software

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

It is known to generate a cut out having a lower resolution from a higher resolution image. This cut-out image can then be broadcast to many user devices over a network. This network may be a broadcast network or a local or wide area network. However, in this case, the user of each device would be able to only view the broadcast stream. In other words, the user has no control over the position of the cut out and so cannot control their virtual camera view.

It is an aim of embodiments of the disclosure to address this.

SUMMARY

The disclosure may be summarised by a client device, comprising: a communication unit configured to receive a plurality of parameters, the parameters defining segments of an image stored on a server, wherein the segments do not overlap; a processing unit configured to allow selection of a segment of the image in accordance with a defined view on the client device and wherein upon selection the segment and an adjacent segment are downloadable from the server; a plurality of the decoders operable to decode the segment and the adjacent segment and a display configured to display on the client device the cut out of the image taken from the segment.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 shows the association between the image tiles and the location thereof stored in the server;

FIG. 11 shows the association between image tiles and the location thereof stored in the client;

DESCRIPTION OF THE EMBODIMENTS

Figure 1:
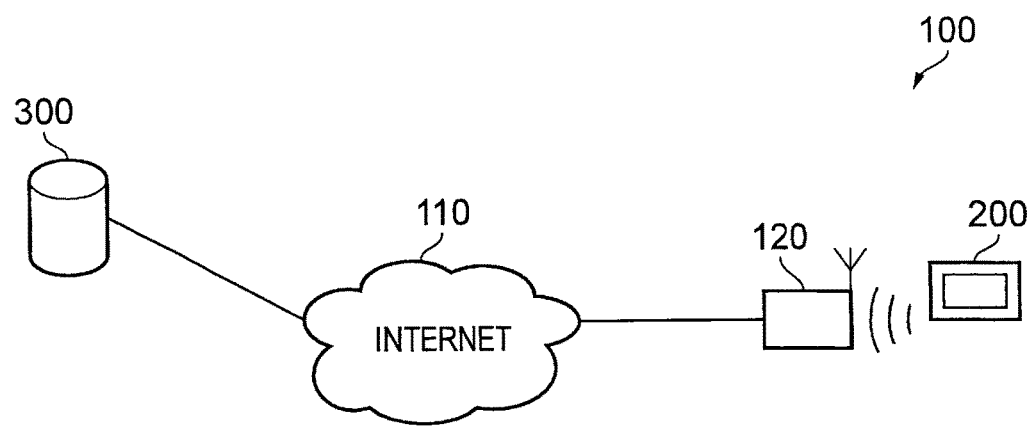
FIG. 1 shows a system according to embodiments of the disclosure.

Referring now to the drawings, wherein like reference numerals designate identical or corresponding parts throughout the several views.

Referring to FIG. 1, a system 100 according to embodiments of the disclosure is shown. In the system 100, a server 300 is connected to the Internet 110. Additionally, a router 120 is also connected to the Internet 110. As would be appreciated, the router 120 enables devices to connect to the Internet 110. In this case, the router 120 is a home router located within a user's home. Of course, the router 120 may be any device that allows any apparatus to connect to the Internet 110. In this case, the router 120 is connected to a device 200 and thus the device 200 connects to the Internet 110. The device, in this case, is a client device that connects to the server 300 via the Internet 110. Although any client device is envisaged, in this case, the client device 200 is a portable client device such as a tablet. The tablet may be a Sony® Xperia Z which runs the Android operating system. However, any tablet device, smartphone, laptop or indeed any client device is envisaged.

Figure 2:
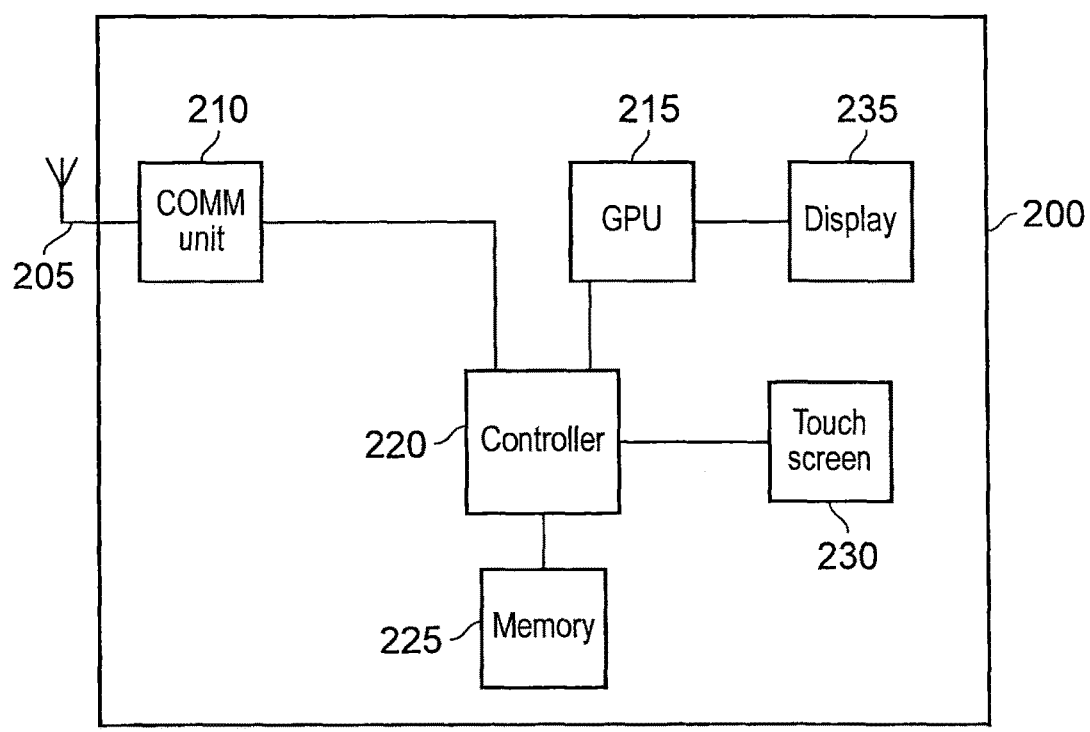
FIG. 2 shows a client shown in FIG. 1.

Referring to FIG. 2, a block diagram of the tablet 200 (client device) is shown. A communication unit 210 is connected to an antenna 205. The communication unit 210 is, in embodiments, communicates with the router 120 using WiFi, such as the IEEE802.11g/n standard. The antenna 205 may be a MIMO type antenna to reduce interference. Of course, any type of wired or wireless protocol is envisaged. Indeed, anything that enables the client device 200 to communicate with the server 300, either directly or via a network, such as the Internet is envisaged.

The communication unit 210 is connected to a controller 220. The controller 220 operates using a computer program which contains computer readable instructions. The computer program which controls the controller 230 is stored on a memory 225 which is also connected to the controller 220. The memory 225 may be any kind of storage medium such as a solid state memory, or indeed, an optical or magnetic readable memory or the like is envisaged. Also connected to the controller 220 is a touch screen 230. The touch screen 230 is a user interface to allow a user to control the tablet 200. In embodiments, the tablet 200 has a "pinch to zoom" function. This will be explained later. Of course, any kind of user interface may be used.

The controller 220 is also connected to a graphical processor unit (GPU) 215. The GPU 215 is a processing unit that is specifically configured to process images. The GPU 215 is entirely optional in embodiments. Further, connected to the GPU 215 is a display 235. The size of the display may vary. For example, in the Xperia ® Z tablet, the display is 10.1 inches and has a resolution of 1920×1200 pixels.

Figure 3:
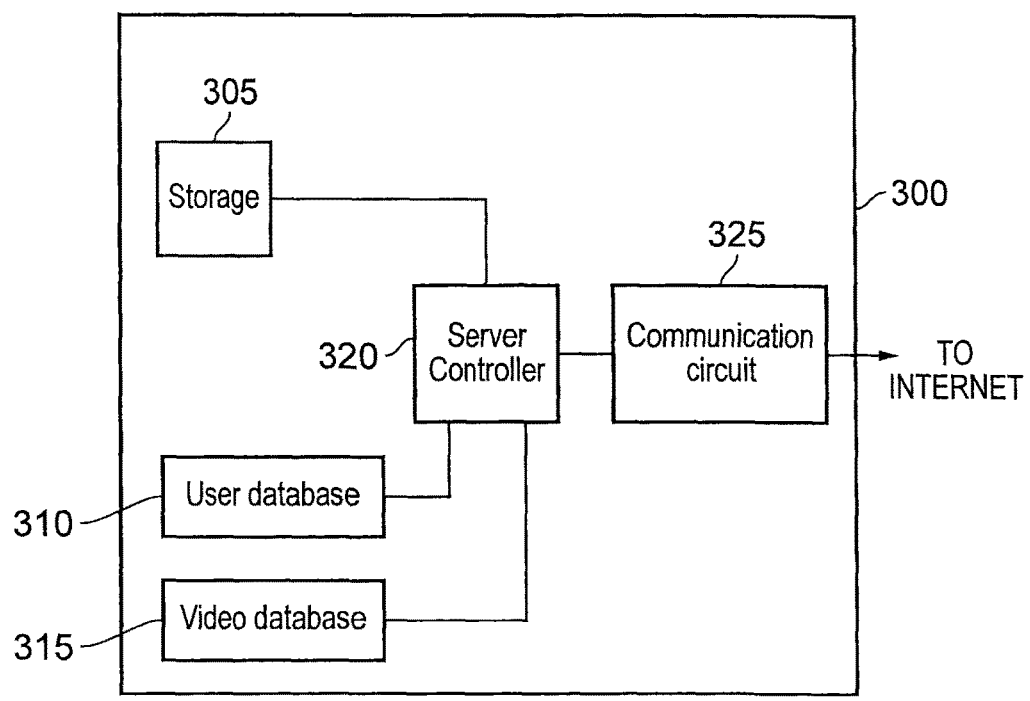
FIG. 3 shows a server shown in FIG. 1.

Referring to FIG. 3, the server 300 according to embodiments of the disclosure is shown. In the server 300 storage 305 is provided. Stored within the storage 305 are video tiles. These will be explained later. Additionally, other video streams may be stored in the storage 305. Moreover, advertisements or still images, or indeed any content may be stored in the storage 305. The storage 305 may be solid state memory, or magnetic or optical readable storage or a combination thereof.

A server controller 320 is provided. The server controller 320 is a processor that controls the operation of the server 300. Further, the server controller 320 performs image processing to generate the image tiles (or segments) stored within the storage 305. The server controller 320 is controlled using a computer program. The computer program contains computer readable instructions which when loaded onto the server controller 320 makes the server controller 320 perform certain steps as will be explained later. Also connected to the server controller 320 is a user database 310. The user database 310 stores details about the users connected to the server 300. This will be explained later. Additionally, a video database 315 is connected to the server controller 320. The video database 315 stores the address of the video tile and associates the address with the appropriate video tile (or any other content) stored within the storage 305 as will be explained later.

Figure 4:
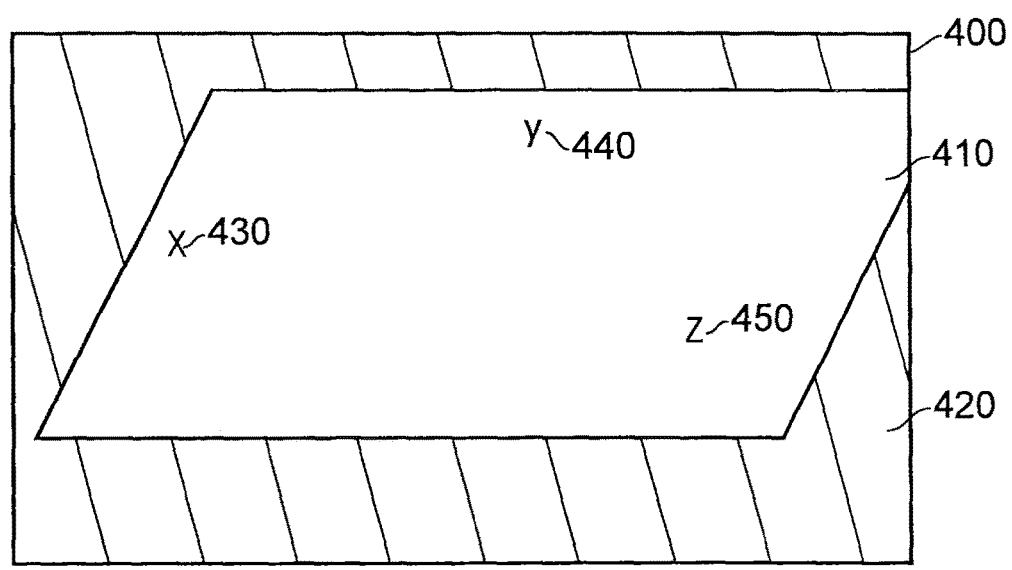
FIG. 4 shows a simple ultra-high definition image with three landmark points.

Also connected to the server controller 320 is a communication circuit 325. The communication circuit 325 connects the server 300 to the Internet 110 and communicates with the client device 200. FIG. 4 shows an image 400. The image 400 contains a soccer pitch 410 and a surrounding area 420. Within the image are three identified points 430, 440 and 450. The first identified point 430 (shown as an "X" in the Figure) is a user selectable icon. The second and third identified points 440, 450 (shown as a "Y" and "Z" in the Figure) is user specific content. These identified points are selected in advance by the content provider and their locations are stored within the tile map shown in FIG. 9. The tile map, as will become apparent, is a set of co-ordinates defining segments in the image.

The image 400 is, in embodiments, an ultra-high definition image. That is, the image 400 is comprised of two images stitched together. Specifically, in embodiments, the image is comprised of two 4K images stitched together. This means that image 400 has a resolution of 8192×2160 pixels. Clearly, any kind of image or any size of image may be used.

Figure 9:
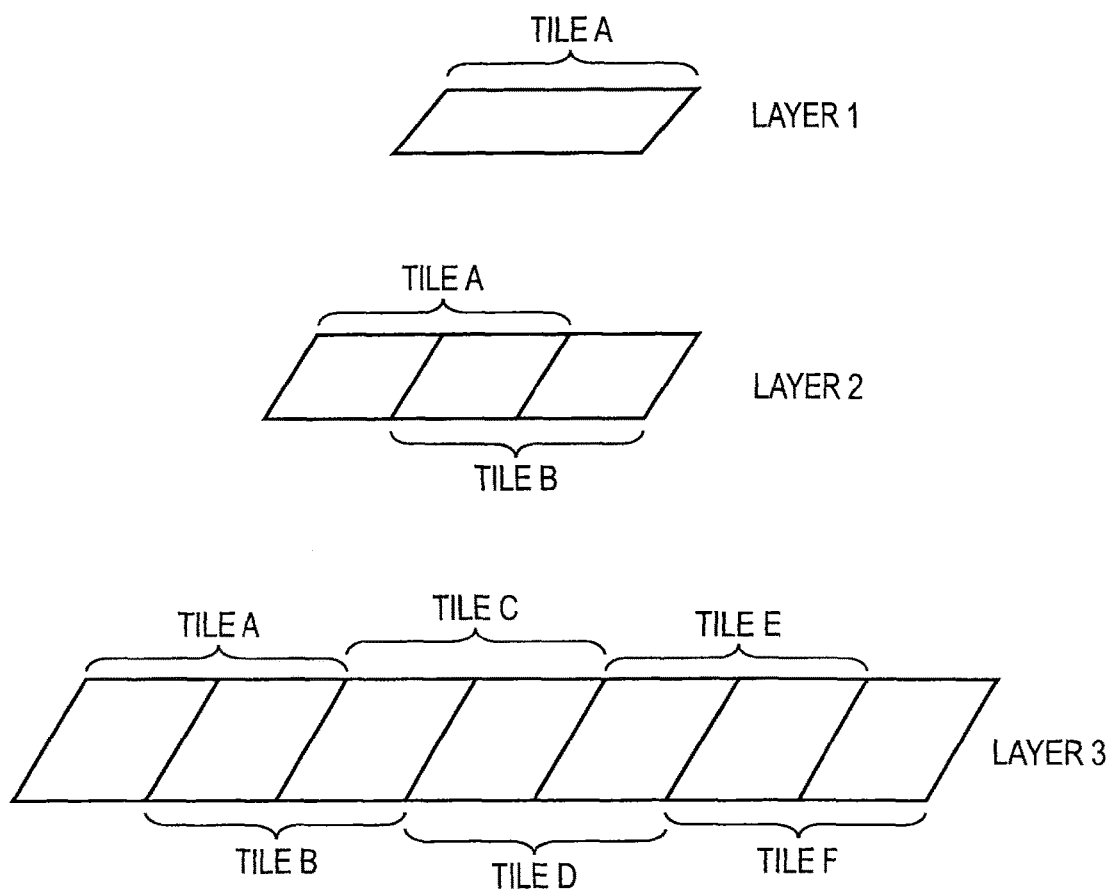
FIG. 9 shows a tile map stored within the client of FIG. 2.

Referring to FIG. 9, the video tiles are explained with reference to the video tile map. The video tile map of FIG. 9 is stored within the memory 225 of the client device 200. This tile map is specific to any particular stream and is downloaded in advance of the content. The tile map is a set of pitch, zoom and yaw values that define segments (or tiles) of the image 400. These pitch, yaw and zoom values are the values that would be applied to a virtual camera when cutting out the tile from the image 400. The method for calculating the pitch, zoom and yaw are known and are disclosed in GB1306050.4 filed on 4 Apr. 2013 and also in GB1316102.1 filed 10 Sep. 2013. The contents of these documents are hereby incorporated by reference. The pitch, yaw and zoom values are examples of parameters which define the tiles (or segments) of the image 400.

As noted above, the pitch, yaw and zoom of the first, second and third identified points 430, 440 and 450 as also stored within the tile map. The video tiles are arranged in layers. These tiles, irrespective of layer, and in embodiments, are all the same size and resolution and may be any size or resolution. However, this is not necessary for the entire breadth of the disclosure. For example, the tiles could be high definition tiles. That is, each tile may have a resolution of 1920×1080 pixels. Further, although FIG. 9 shows tiles only overlapping in the horizontal direction, this is only for ease of explanation. It is also intended that tiles overlap both the horizontal and vertical directions and give the advantages explained below in all directions in the image. Alternatively, the size of the tile could depend on the display resolution of the of the client device as will become apparent. Although not necessary, it is preferable that the resolution of the tile conforms to an acceptable standard size to ensure high efficiency codecs for efficiency in storage and transmission. In other words, the size of the tiles is a size for which regular codecs exist. The high definition example is an acceptable standard size tile.

These layers correspond to different zoom levels within the image 400. That is, in layer 1, one tile covers the image 400 and so the content of the tile is the entire image 400 albeit at a reduced resolution. In other words, the content of the image 400 is provided at a resolution of the tile rather than the ultra-high definition resolution.

In layer 2, the image 400 is split into a plurality of overlapping tiles. As the resolution of the tiles between the layers is the same, and because the image 400 is split into more tiles in layer 2 than in layer 1, the content of each of the two tiles within layer 2 contains a different segment of the image 400 (except for an overlapping section which will be explained later). This means that the content of tile A in layer 2 contains the left side of the image and the content of tile B in layer 2 contains the right side of the image 400. Therefore, the content of each tile segment in layer 2 appears magnified when compared to the content of the tile in layer 1.

Similarly, in layer 3, the image 400 is split into six overlapping tiles all having the same resolution as the tiles in layer 1 and 2. The content of each of the tiles in layer 3 is therefore a more magnified version of the content in each of layer 1 or 2.

To summarise, therefore, the different layers all contain a different number of tiles. The resolution of all the tiles, irrespective of layer, is the same. Therefore, the more tiles contained in a layer, the more "zoomed" into the image 400 the content within that tile appears. As explained above, it is also important to note here that the view of each tile has a zoom value, a pitch value and a yaw value associated with it. In other words, each tile within each layer is analogous to a virtual camera capturing part or the image 400. The amount of pitch, yaw and zoom which must be applied to the virtual camera in order to capture this field of view is determined using a known technique such as that described in GB1306050.4 filed on 4 Apr. 2013 and also in GB1316102.1 filed 10 Sep. 2013, the entire contents of which is hereby incorporated by reference. The zoom value, pitch value and yaw values are stored in the client device 200 in association with the tile. The tiles of the image are pre-processed and stored on the server.

As will be explained later, as the client device 200 requests different tiles to be provided by the server 300, the user of the client device can zoom into the image 400. In other words, the client device 200 starts by displaying the content of the tile of layer 1 and if the user wishes to zoom into the image, the client device 200 requests the appropriate tile from layer 2 and then layer 3 in order to allow the user to zoom into the image and to thus control the zoom of a virtual camera around image 400. In other words, the client device 200 also generates a virtual camera view of the tile provided to it by the server 300. Again, the technique for determining the client side virtual camera parameters (the zoom, pitch and yaw) is determined using a known technique such as that disclosed in GB1306050.4 filed on 4 Apr. 2013 and also in GB1316102.1 filed 10 Sep. 2013. Specifically, the pinch control on the client device 200 controls the zoom axis of the client side virtual camera and the swipe action controls both the pitch and yaw axes of the client side virtual camera.

The tiles will be explained in more detail with reference to FIGS. 5, 6 and 7.

Figure 5A:
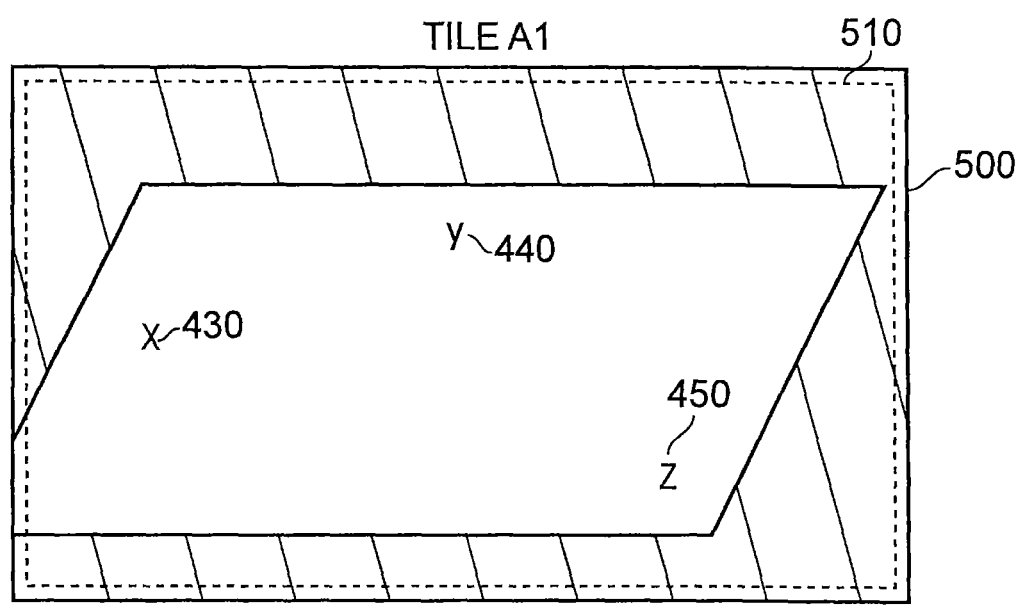
FIG. 5A-5B shows an image tile taken from the image of FIG. 4 and an indicated virtual camera view provided to the client of FIG. 2.

Referring to FIG. 5A, the image 400 is provided as one tile segment 500. In the numbering of the Figures, the name of the tile indicates a unique letter identifying each tile within a layer as well as the number of the layer. So, in FIG. 5A, the image 400 is contained within one tile 500. This tile is "tile A1" (or is tile A in layer 1). In FIG. 5A, a dotted box 510 is provided within the tile 500. This dotted box 510 indicates the view that is being displayed on the client device 200. As will be explained later, the server 300 provides the content of the tile to the client device 200 and the client device 200 will extract the appropriate section of the tile for display to the user. However, the dotted box 510 has been included to aid explanation.

Figure 5B:
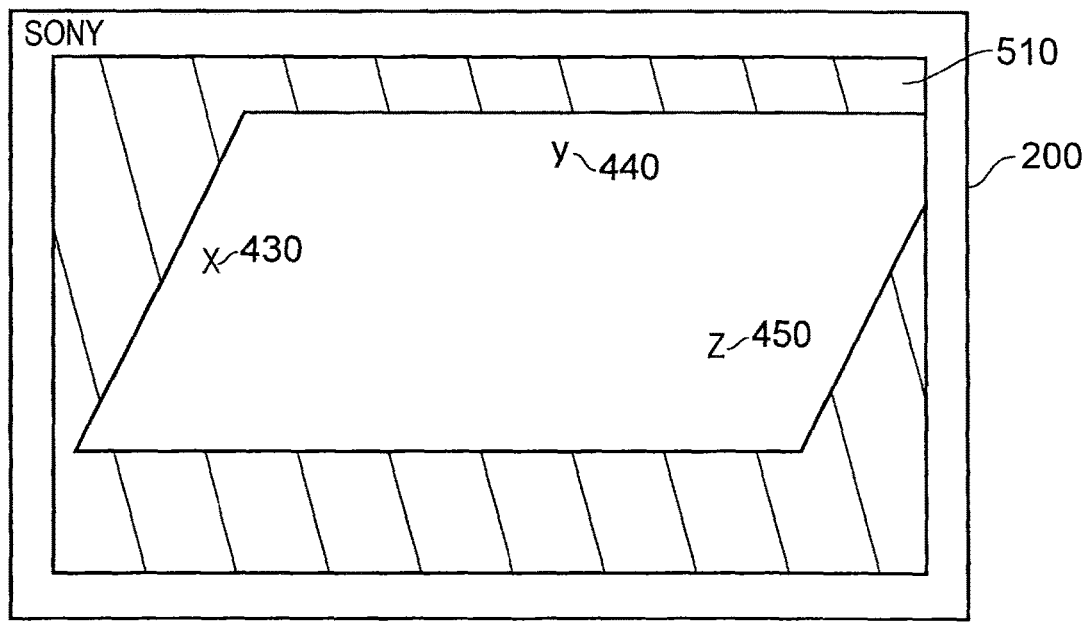

Referring to FIG. 5B, the screen of the client device 200 is shown. As can be seen, the content of the dotted box 510 in FIG. 5A is displayed to the user of the client device 200.

Imagine that the user of the client device 200 wishes to zoom in to the first identified point (point X) 430 of the image 400. The user will perform a "pinch to zoom" action on the touch screen 230 around the first identified point 430. In the specific case, the user will swipe the screen to pan around the image 400 to align the first identified point 430 with the centre of the view. Once the desired view is reached, the pinch zoom is applied which increases the zoom parameter of the client side virtual camera and thus zooms in on the centre of the view.

Figure 6A:
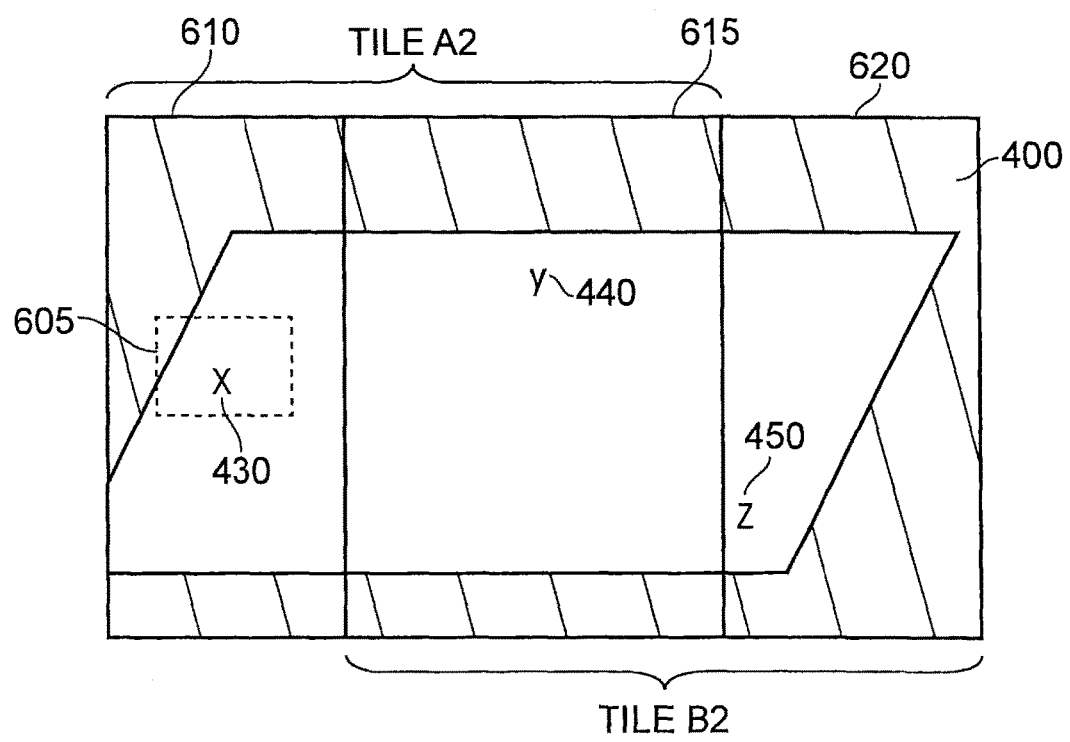
FIGS. 6A-6H shows a plurality of image tiles taken from the image of FIG. 4 and various indicated virtual camera view provided to the client of FIG. 2.

Referring to FIG. 6A, the dotted box 605 shows the section of the image 400 that is being displayed on the client device 200. However, as the user of the client device 200 performs such a zoom, and as will be explained later, the client device 200 determines that a tile from layer 2 is required. In other words, the user of the client device 200 wants a more detailed view of the first identified point (point X) 430 than was possible using tile A from layer 1. Therefore, the client device 200 requests a tile from layer 2 as the zoom action takes place.

This is achieved, in embodiments, by the client device 200 knowing from the tile map stored in the memory 225 the zoom, pitch and yaw values of each of the tiles. The client device 200 then compares the client side zoom, pitch and yaw of the image shown on its display to the zoom, pitch and yaw of the stored tiles. The client device 200 then retrieves a tile with the zoom, pitch and yaw closer to the client side value of zoom, pitch and yaw of the tile currently being displayed. It is important to note that the client device 200 will switch to a different tile when the view displayed on the client device 200 will not fit inside the tile view.

It is also important to note that at the time of tile generation, the server 300 ensures that there is sufficient overlap between the tiles to allow the view of the client device 200 to fit within the overlap region. Additionally, the client device 200 will only ever have a zoom level higher than the zoom level associated with a particular tile. Therefore, when searching for a new tile, the client device 200 may only search tiles having a zoom level lower than the current zoom level associated with the client device 200. This reduces processing requirements of the client device 200.

Further, the client device 200 employs a predictive scheme such as a linear scheme or a Kalman filter in order to predict which tile needs downloading next. Specifically, in FIG. 6A and in layer 2, image 400 is split into two tiles, tile A2 and B2. In this, tile A2 has two parts. A first part 610 of tile A2 covers the left side of the image 400 and a second part 615 of tile A2 covers a more central position. The second part of tile A2 overlaps with a second part of tile B2. The first part of tile B2 covers the right side of the image 400. Therefore, the client device 200 retrieves tile A2 from the storage 305 within the server 300.

Figure 6B:
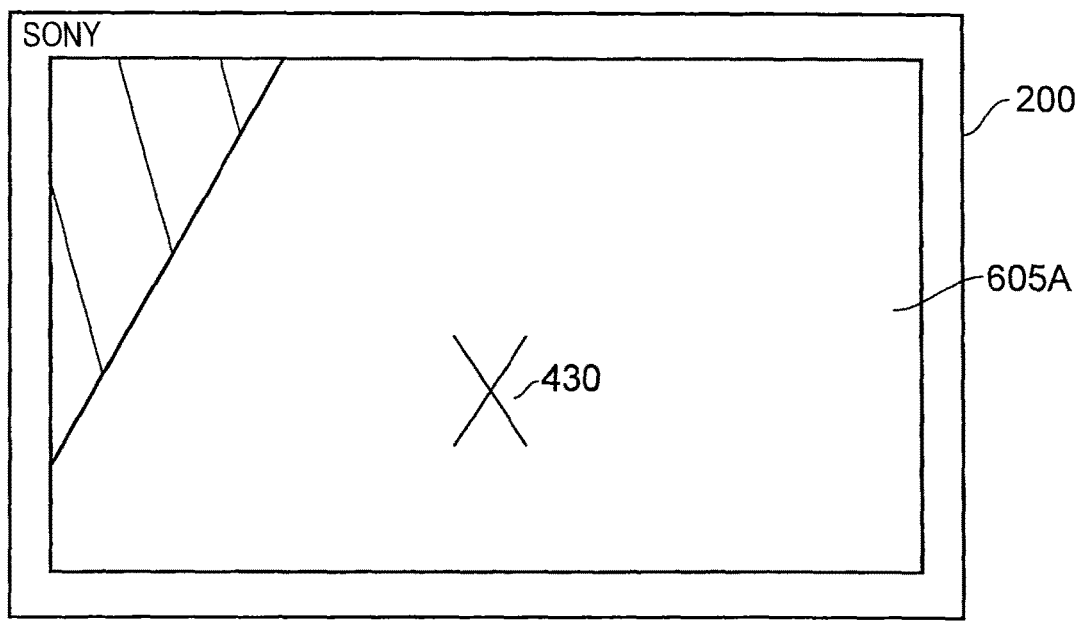
Figure 6C:
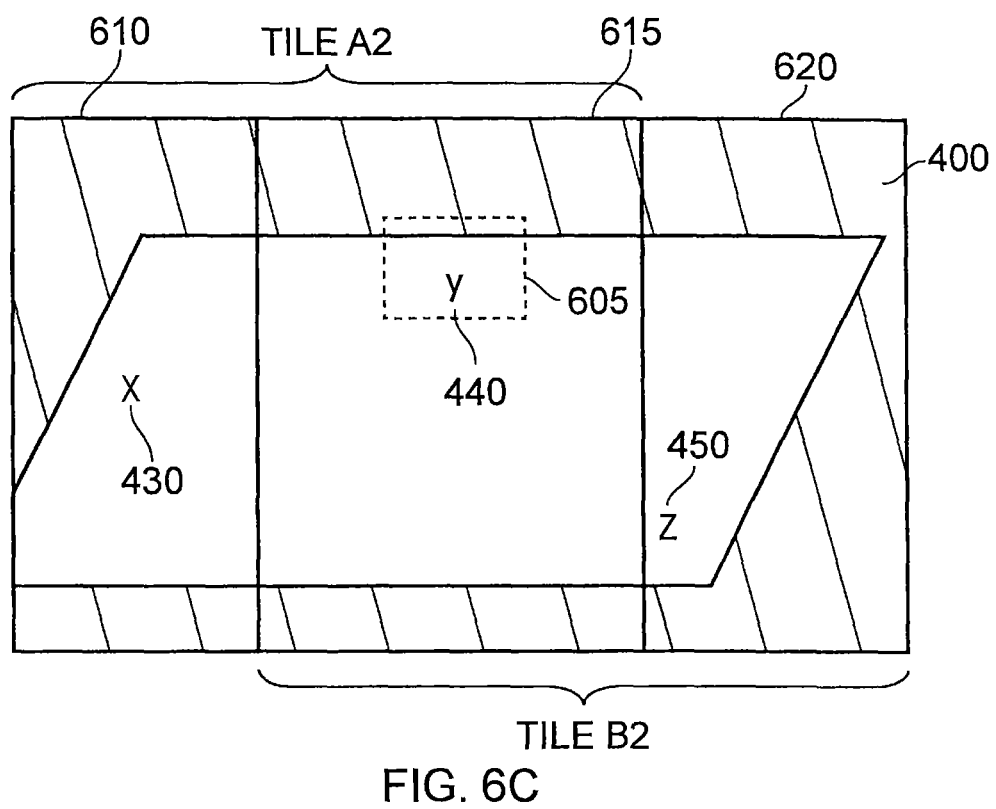

As shown in FIG. 6B, the dotted box 605A is shown on the client device 200. As can be seen, the first identified point (point X) 430 appears much larger on the display of the client device 200. Although not explicitly shown in FIG. 6A, but as noted above, the two tiles (Tile A2 and Tile B2) are provided with zoom, pitch and yaw values. These values indicate the zoom, pitch and yaw values of a virtual camera capturing the image of the tile from the image 400. In other words, the zoom, pitch and yaw values of the tiles are those values of a virtual camera capturing the image of the tile from image 400. As understood by the skilled person, the relationship between two perspective views is defined by an homography. The tile view is defined by zoom, pitch and yaw with respect to the image 400 and the client device view is defined by zoom, pitch and yaw. The homography transform in this case is calculated from the differences in the zoom, pitch and yaw between the client device 200 view and the zoom, pitch and yaw of the specific tile.

Figure 6D:
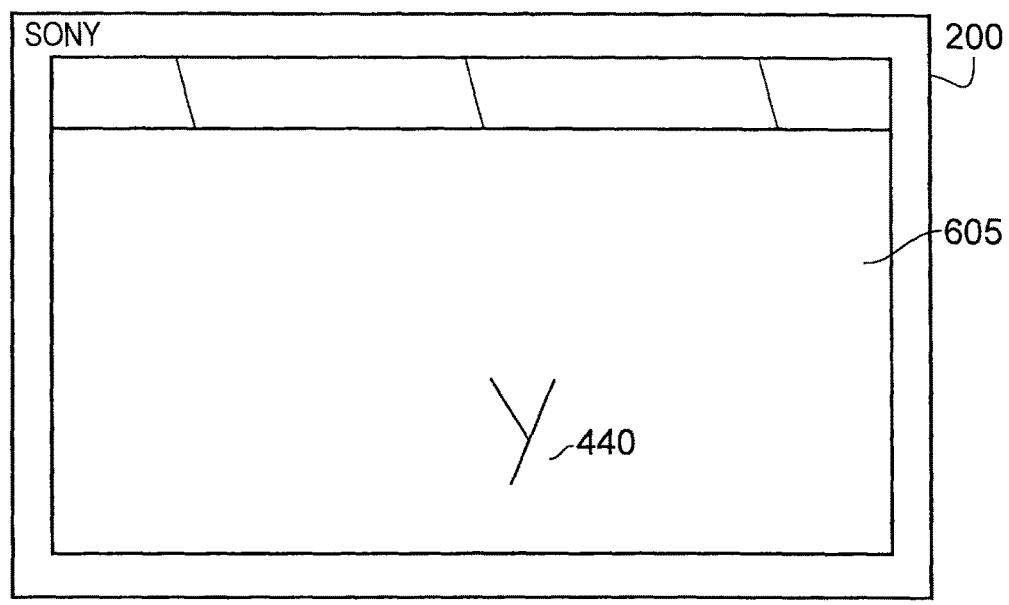

Next, if the user of the client device 200 swipes the touch screen, the user of the client device 200 can move around the image 400 at this zoom level. Therefore, if we assume the user of the client device 200 moves the view to the right, the view displayed to the user will change. In particular, we can assume that the user of the client device 200 has "swiped" the touch screen such that the view displayed to the user is new dotted box 605 in FIG. 6C. In other words, the user of the client device 200 is now viewing the second identified point (point Y) 440. This view is shown in FIG. 6D.

As the client device 200 knows the starting zoom, pitch and yaw client side parameters of the dotted box (the position in FIG. 6A), the client device 200 calculates the client side zoom, pitch and yaw of the new dotted box 605. It should be noted here that the user has moved their view into the second area 615 of tile A2. In other words, the dotted box 605 which indicates the image displayed on the client device 200 is taken from the overlapping region 615 between tile A2 and tile B2.

In order to ensure that the user of the client device 200 may continue scrolling to the right smoothly, the client device 200 requests that tile B2 be provided to the client device 200 from the server 300. It is important to note here that in order for the client device 200 to have time to download the next tile, the size of the dotted box 605 must be smaller than the overlap region 615. If the dotted box were larger than the area of overlap then the client device 200 would not be able to display a complete image for intermediate views between tiles.

Figure 6E:
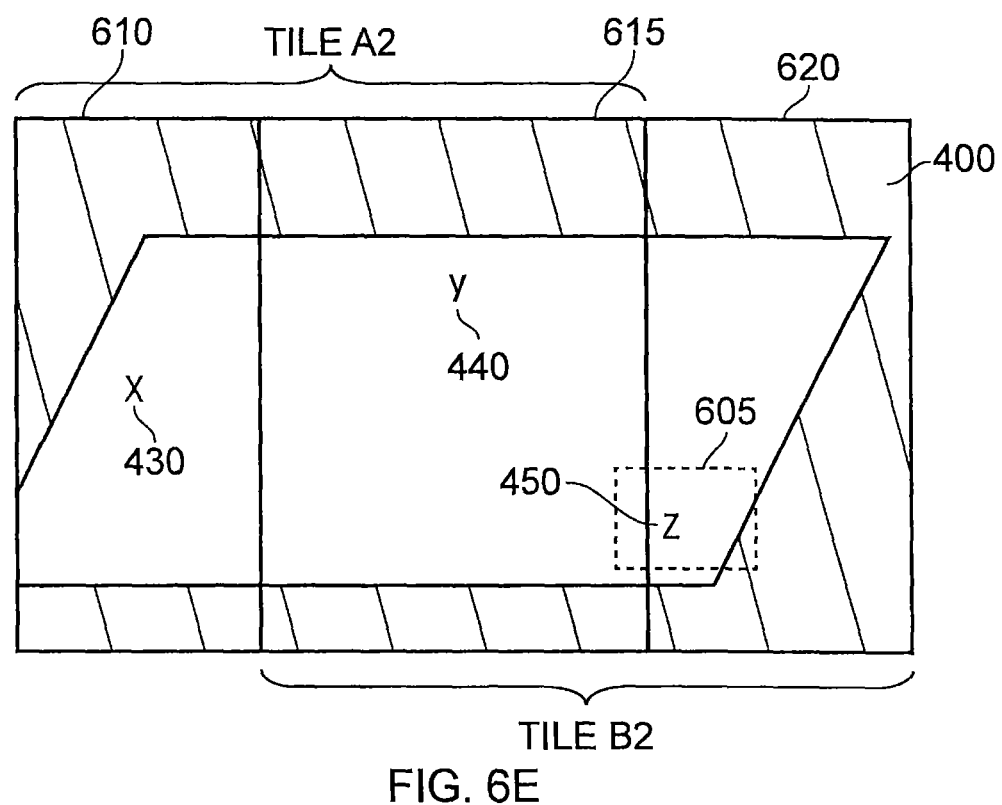
Figure 6F:
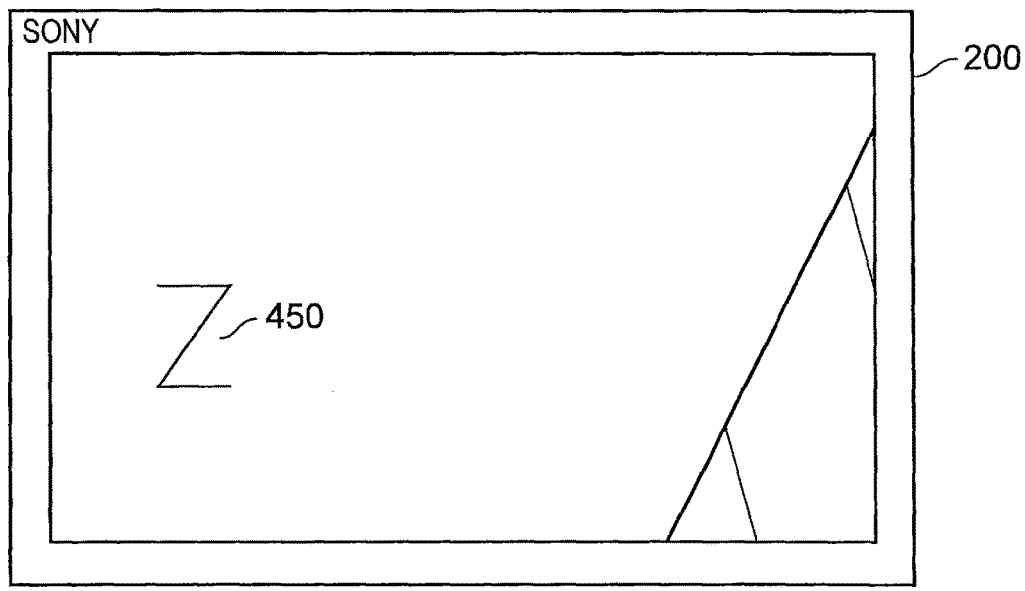

When the user of the client device 200 scrolls to the area shown in FIG. 6E, the content of tile B2 is downloaded from the server 300 and the client device 200 can display the third identified point 450 as shown by the dotted line box 605 and shown in FIG. 6F. This is because the content of the dotted line box 605 in FIG. 6F is provided by tile B2 rather than tile A1.

Figure 6G:
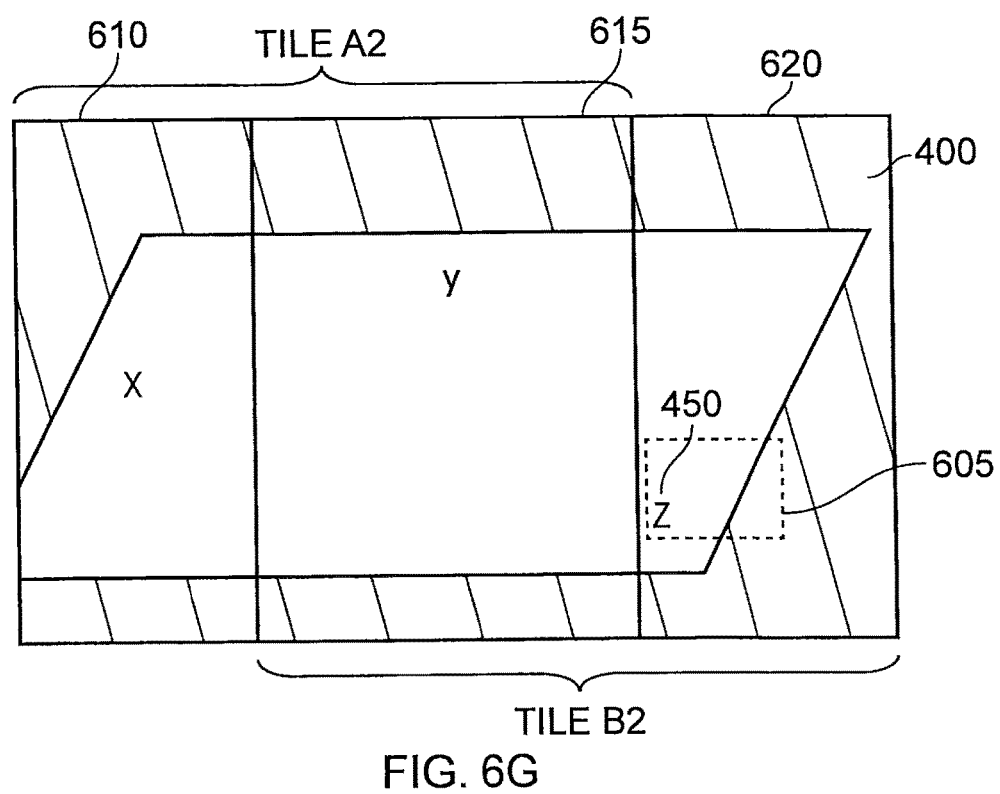
Figure 6H:
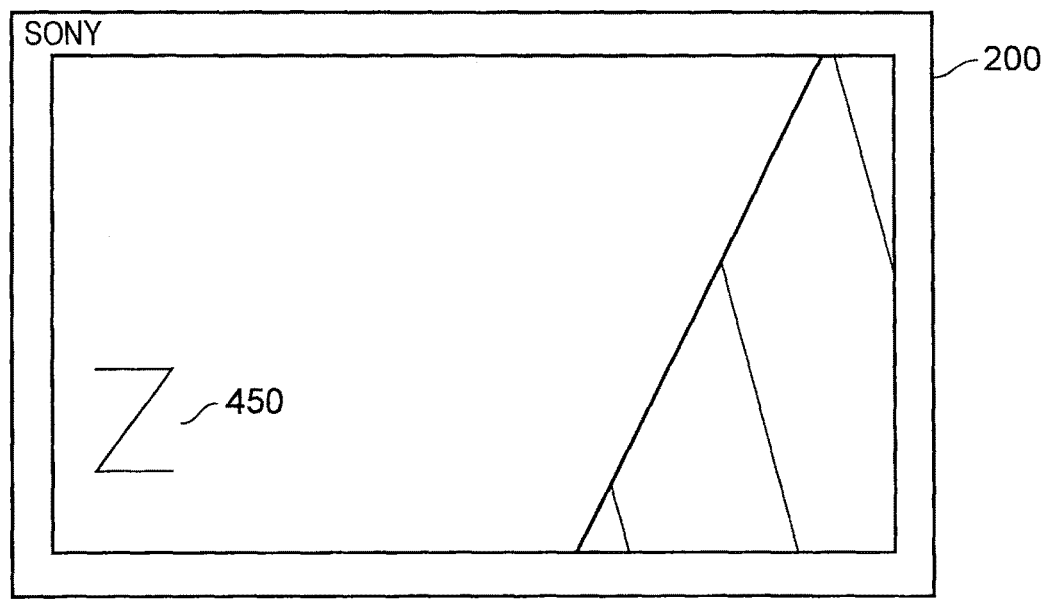

The user then continues their movement to the right of the image 400. As can be seen in FIG. 6G, the dotted line box 605 is from the first (non-overlapping) part of tile B2. The displayed view is shown in FIG. 6H.

Figure 7A:
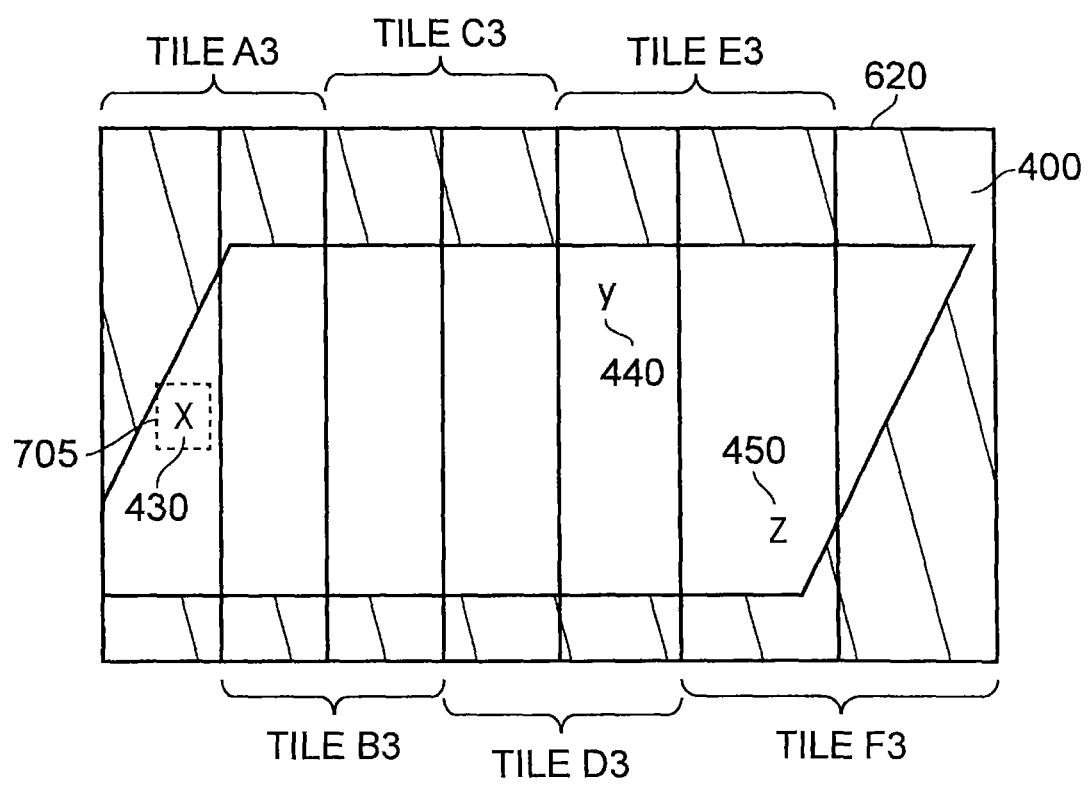
FIGS. 7A-7F shows a plurality of image tiles taken from the image of FIG. 4 and various indicated virtual camera view provided to the client of FIG. 2.

Referring now to FIG. 7A, a view of the image 400 split into six tiles of layer 3 is shown. Specifically, the image 400 is split into tile A3, B3 . . . F3. Each of these tiles has two sections. The first section of each tile, similar to that described above with reference to FIG. 6A-6H, covers an area of the image 400. The second section overlaps with the preceding tile so that as the user controls the view on the client device 200 and the dotted box 705 effectively moves across the image 400, the next tile in the view can be downloaded from the server 300 to the client device 200. The client device 200 then displays the appropriate cut out from the tile.

Figure 7B:
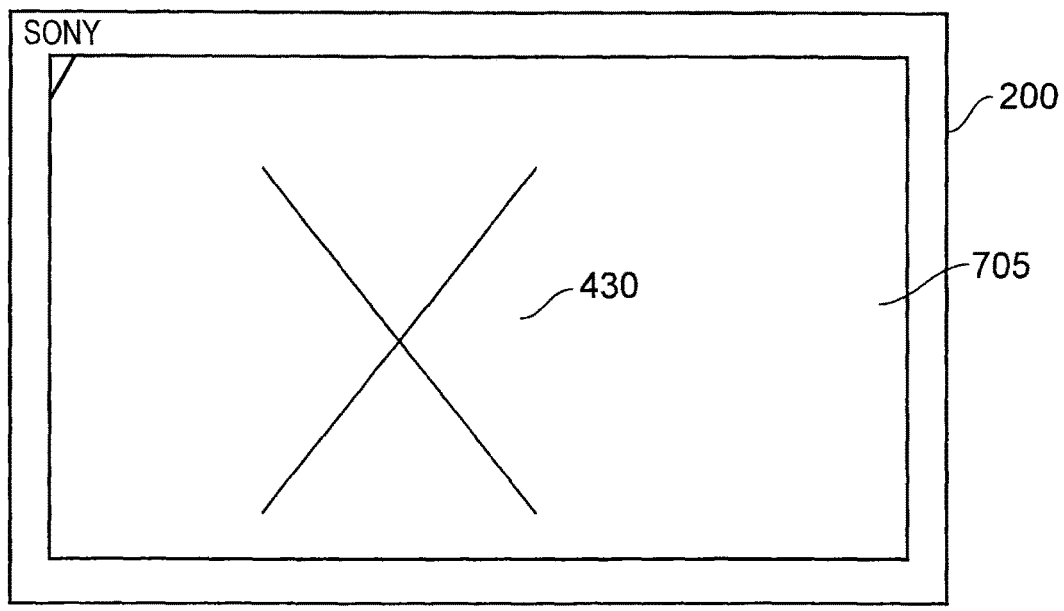
Figure 7C:
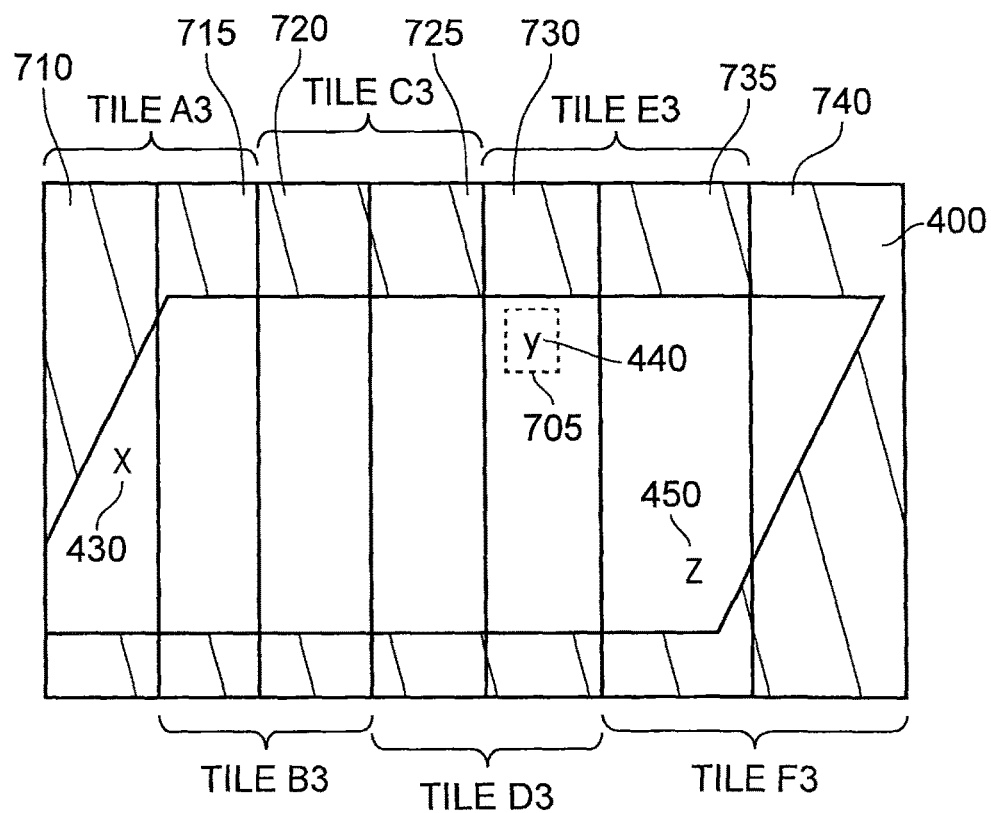
Figure 7D:
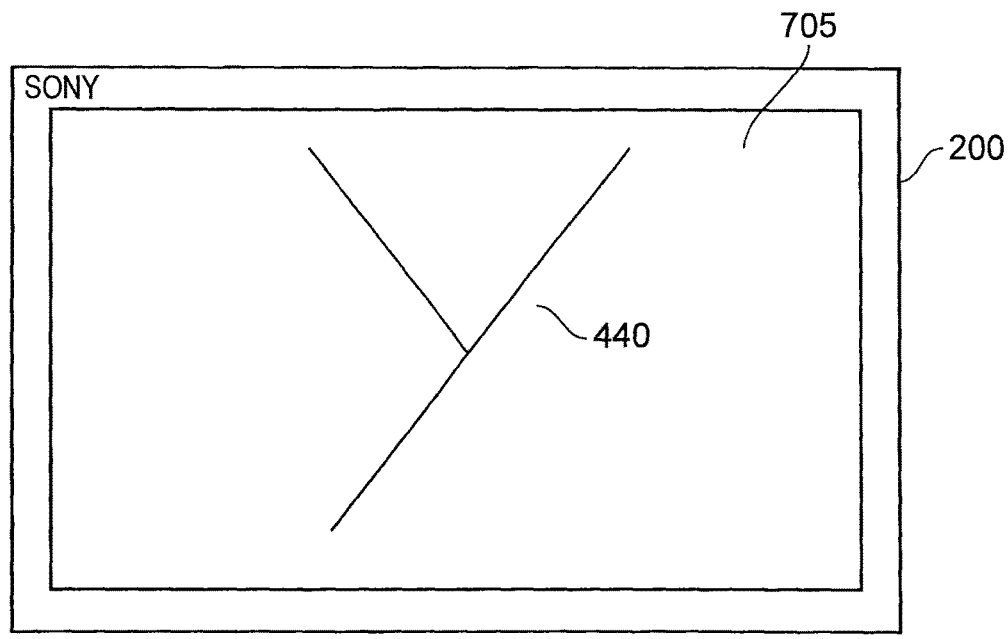
Figure 7E:
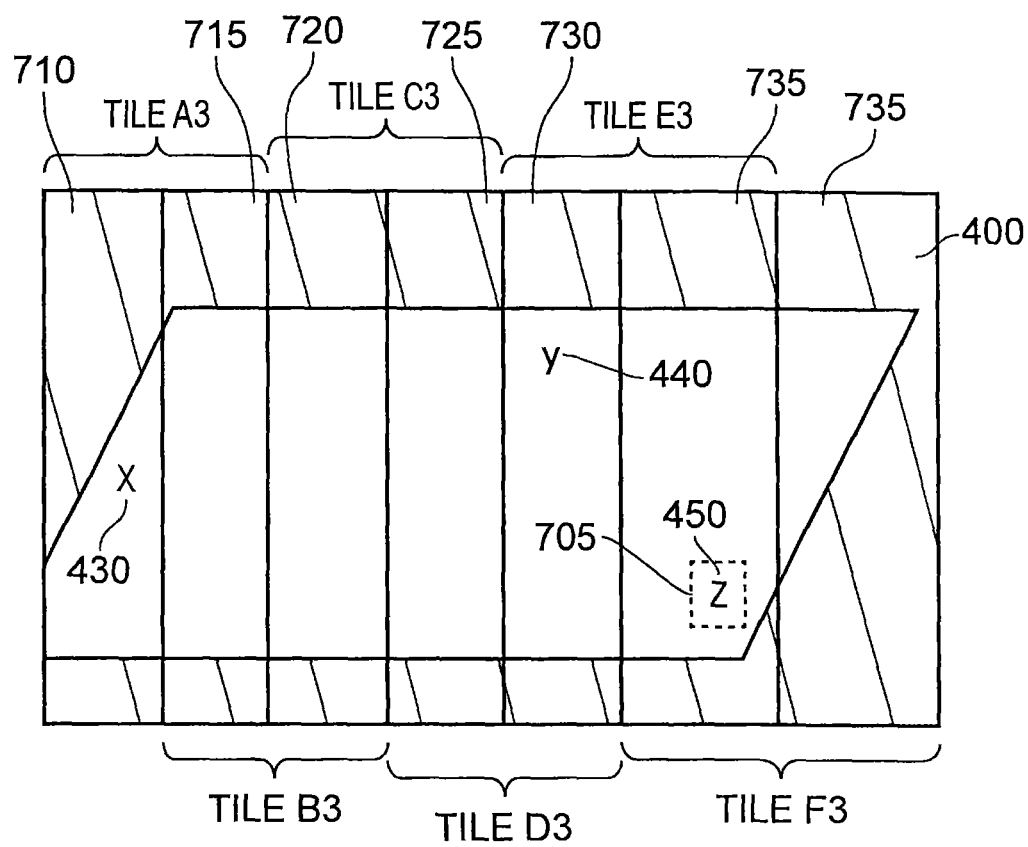

So, in FIG. 7A, the dotted box 705 indicates that the user of the client device 200 is viewing the first indicated point 430. Importantly, the position of the dotted box 705 in this Figure indicates that the user of the client device 200 performed a pinch to zoom operation on the position of the dotted box 605 in FIG. 6A. For ease of reference, the co-ordinates of the dotted box 705 is shown in FIG. 7A. Specifically, the zoom, pitch and yaw of the dotted box 705 are known to the client device 200 as the user performed a pinch to zoom operation. Illustratively, as the dotted box 705 is smaller in the image 400, this indicates that the user of the client device 200 has zoomed in more closely on the first indicative point 430. In other words, as the user has zoomed in on the first indicated point 430, the client device 200 retrieves tile A3 from the server 300. That is, the client device 200 retrieves tile A from layer 3. This zoomed in view displayed to the user is shown in FIG. 7B.

Figure 7F:
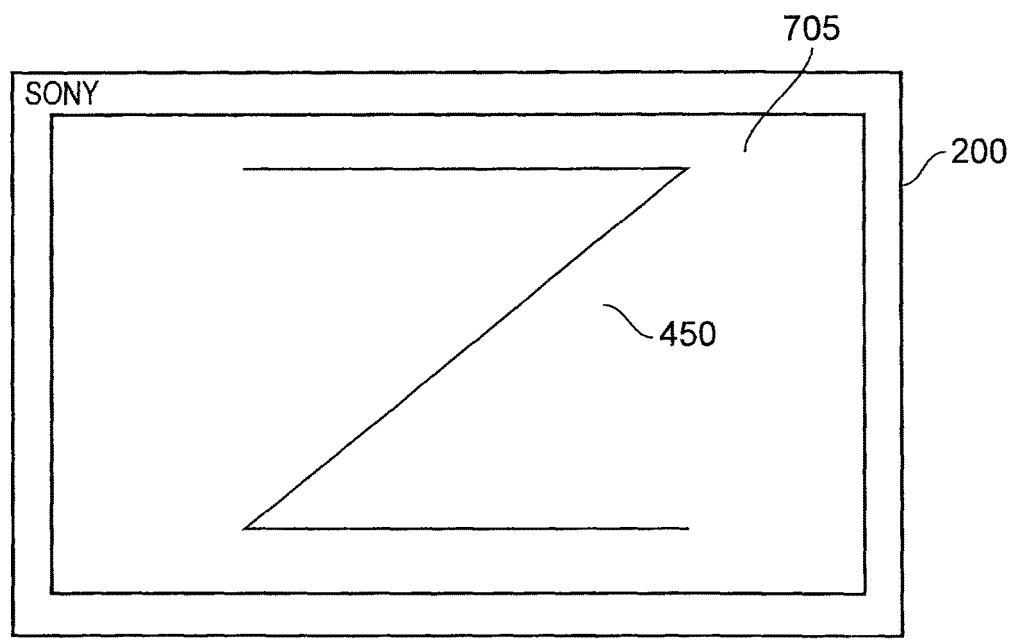
Figure 8A:
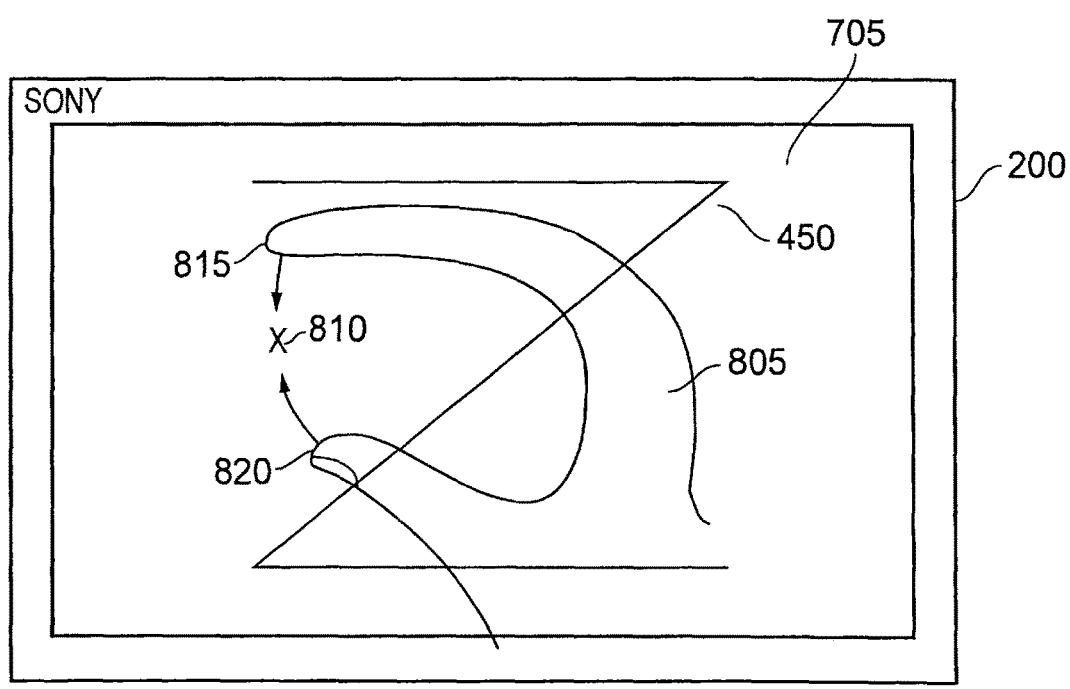
FIGS. 8A and 8B show a user zooming out of the image of FIG. 7F using the client of FIG. 2.
Figure 8B:
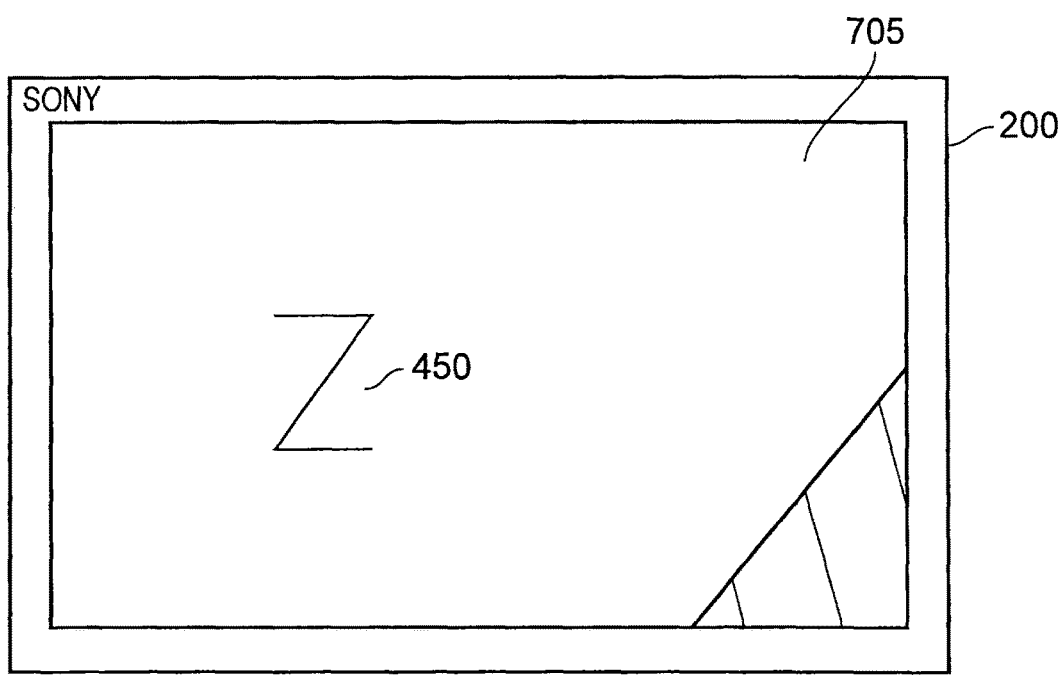

Again, the user continues to scroll to the right at the same zoom level. The dotted box 705 indicates that the user is located over the second indicated point 440. As will be apparent, the client device 200 will have requested tile D3 from the server 300 as the user moved across the image 400. The second indicated point 440 is located in the first part of tile E3 and the second part of tile D3. In other words, the second indicated point 440 is located in the overlap between tile D3 and tile E3. Therefore, the client device 200 now retrieves tile E3 from the server 300. The view on the client device 200 is shown in FIG. 7D Again, the user continues to scroll to the right at the same zoom level. The dotted box 705 indicates that the user is located over the third indicated point 450. As will be apparent, the client device 200 will have requested tile E3 from the server 300 as the user moved across the image 400. The third indicated point 450 is located in the first part of tile F3 and the second part of tile E3. In other words, the third indicated point 450 is located in the overlap between tile E3 and tile F3. Therefore, the client device 200 now retrieves tile F3 from the server 300. The view on the client device 200 is shown in FIG. 7F. FIG. 8A shows the view on the client device 200 of FIG. 7F with a user of the client device 200 wishing to zoom out. The user's hand 805 is located over the touch screen 230. The user's hand 805 touches the screen at points 815 and 820. Point 810 is equidistant between point 815 and point 820. As the user moves his or her finger in the direction of the arrows (i.e. towards point 810), the displayed image will appear to zoom out and FIG. 8B shows the image displayed on the client device 200. FIG. 10 shows a table that is stored within the server 300. Specifically, the table shows the association between the location of the video tile stored within the storage 305 and the name of the video file. The table shows a Unique Resource Locator (URL) identifying the unique address of the storage 305 in which the video tile is stored. In more general terms, the URL may also be a Unique Resource Identifier (URI). The table is stored within the video database 315 of the server 300. Of course, although this embodiment mentions only a single server for brevity, it is possible that the content will be stored on multiple servers. These servers may form part of a so-called "Cloud Service". Although the content may be distributed in any fashion amongst the servers, it is possible that each server will provide a subset of the tile streams. By providing the tile streams from multiple servers, the number of client devices 200 connected to the service is scalable.

During operation of the client device 200, the client device 200 downloads the tile from the appropriate URL. The tile is stored as an MPEG4-AVC elementary stream with an accompanying index file that specifies the location in the stream of each key-frame. Although, of course, the tile may be stored as any appropriate image file. Furthermore, it should be noted that the content of the video is stored for the duration of the program. This allows the user to not only control the virtual camera position but that the user can also rewind, pause and fast forward through the content. By uniquely identifying each frame (or Group of Pictures) within the content, each user is allowed to have frame accurate control of the pause, fast forward and rewind through the content. The frame (or Group of Pictures) number is provided after the ":" in the URL.

FIG. 11 shows a table stored within the client device 200. Specifically, the table of FIG. 11 is stored within the memory 225 of the client device 200. The table of FIG. 11 is downloaded from the video database 315 of the server 300 before the program is to be viewed on the client device 200. The table shows the tile name and the URL where the tile is stored. Further, as will be noted, the URL includes the query <insert-time>. As will be explained later, the client device 200 retrieves this value from a counter. The server 300 therefore knows which Group of Pictures to retrieve from the server 300. Specifically, a Group of Pictures is retrieved because it is only possible to switch tile streams on a Group of Picture/Key frame boundary. The Group of Picture length is 15 frames (or 0.5 seconds), in embodiments. Therefore, as the switch between title streams can only happen on a Group of Picture/Key Frame boundary, there is a switching latency of at least 0.5 seconds.

Additionally provided in the table are the zoom, pitch and yaw values associated with each tile. These parameter values of the tile are required so that the client device 200 can determine which tile to request from server 300.

Although not specifically shown in the Figure, the co-ordinates of the first to third indicated points are also provided. The co-ordinates may be either real world 3D positions or 2D co-ordinates in the image 400. Indeed any invariant co-ordinates that may be easily transformed into the view of the client device 200 may be used. Additionally, in the case of the first indicated point (which is a user selectable icon), a URL to the icon is provided so that when the first indicated point is being displayed to the user, the client device 200 can retrieve the icon from the server 300. Additionally, the URL may re-direct the user to a different stream of content (for example a broadcast stream of content following a particular player within the content of the image 400) for display on the client device 200. This view of the player may be provided as an virtual camera view from the image 400 using player tracking information. Alternatively, this view may be from a dedicated camera. As another example, in a multi-disciplinary event such as the Olympics, a user may be provided with a stadium view. The user can then navigate and/or zoom around the stadium identifying the different events taking place in the stadium. The user may then select a particular indicated point within the client view. This selection will then re-route the user to a particular broadcast video stream using the URL associated with the identified point. Indeed, if there is no available current live broadcast, then either the user of the client device 200 is informed of this, or the user of the client device 200 is re-routed to alternative content based on either the user or the particular selected event. In some embodiments, the selection of the particular identified point may be either touching the identified point on the touch screen or may be selected by zooming in to the identified point beyond a certain level of zoom.

Further, with regard to the second and third indicated point, this is content that is provided specifically to the user. As will be explained later, the second and third indicated point may include advertisement content specifically targeted to the user of the client device 200. The user of the client device 200 may then select such advertisement which may redirect the user to a different URL such as the website of the advertiser. This may lead to the generation of user specific metadata which could be useful for an advertiser for obtaining data related to the impact of a particular advert or for determining the amount of revenue and advertiser has to pay the broadcaster or service provider.

Figure 12:
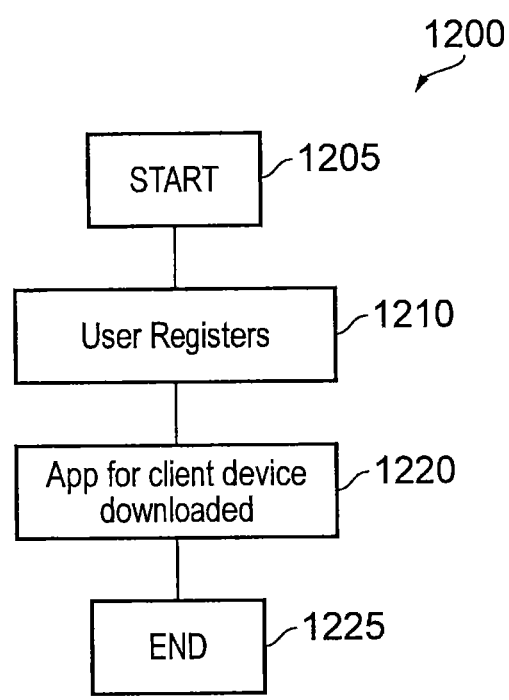
FIG. 12 shows a flow chart of an initial registration of the user of the client device.

FIG. 12 shows a flow chart 1200 explaining the initial operation of the system. The process starts in step S1205. The user of the client device 200 then registers with the system. The user provides a unique reference that uniquely identifies one user from another user. This may be an Email address, a unique username or the like. The user may be registered using their Sony Network username or their Android username, for example. During the registration process details of the user may be collected such as payment details, loyalty card details or the like. Indeed, the user may be asked questions to determine their personal preferences and shopping habits. These may be taken at the time of registration or from any loyalty schemes that the user may subscribe to or any social media accounts which are linked to the user during registration. This information is stored within the user database 310 located in the server 300. After successful registration, the application is downloaded to the client device 200 in step 1220. In other words, the software required to configure the client device 200 is downloaded and stored within the memory 225 of the client device 200.

The initial registration process is then completed in step 1225.

Figure 13:
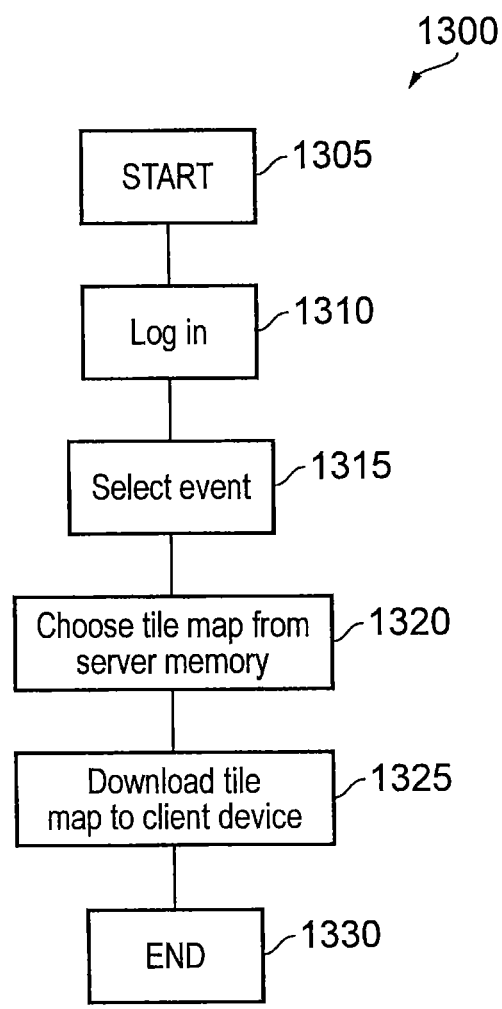
FIG. 13 shows a flow chart of a the selection of an event to view on the client device.

FIG. 13 shows a flow chart 1300 explaining the operation of the system when a user of the client device wishes to view a program. The flow chart starts in step 1305. The user of the client device 200 logs in to their account set up in the initial registration process of FIG. 12. The user is then permitted to select an event to watch in step 1315. The selection may be a recommendation according to the user's previous events or may be restricted to a certain age profile or the like.

After the user has selected the event, the server 300 selects the appropriate tile map from the video database 315. The tile map is downloaded to the client device 200 in step 1320. As explained, the tile map is the table shown in FIG. 11. This is stored in the memory 225 of the client device 200.

The process then ends at step 1330.

Figure 14:
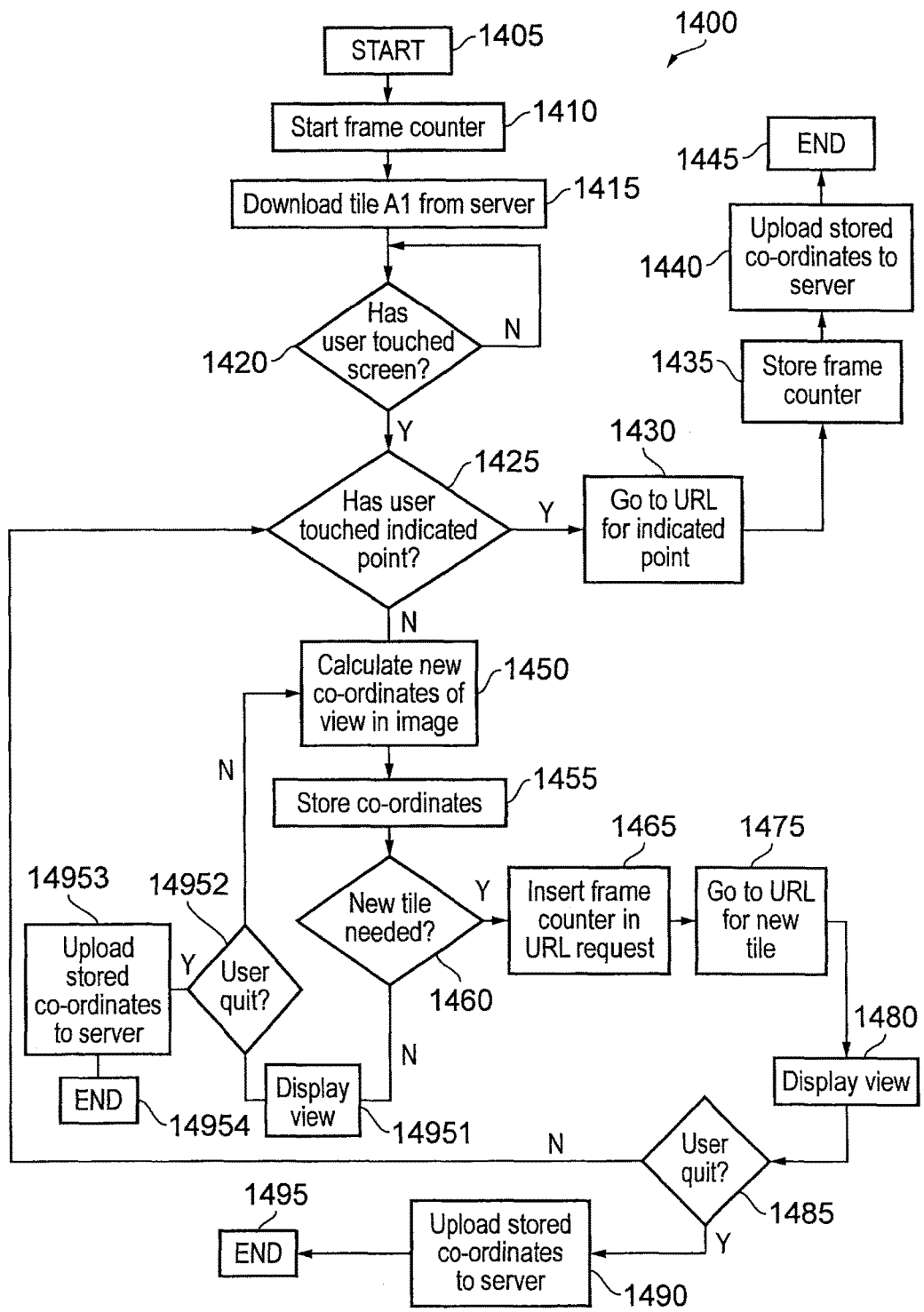
FIG. 14 shows a flow chart explaining the operation of the client device.

FIG. 14 shows a flow chart 1400 explaining the operation of the client device 200. The flow chart starts at step 1405. The client device 200 starts a frame counter in step 1410. The GOP counter is incremented every time the client device displays a new GOP. This allows the client device 200 to request the correct tile with frame accuracy from the server 300. The client device 200 downloads the first tile from the server 300 in step 1415. The first tile in this example is tile A1 although the disclosure is not so limited and any tile may be selected as the initial tile either automatically or through user preference.

The client device 200 then determines whether the user has touched the touch screen 230. This is step 1420. Of course, if the client device 200 is being operated using a mouse or other input device, the client device 200 will determine if the user has performed any input operation. If the user does not perform an input, the client device 200 waits until such an input is received. In reality, although the Figure shows a loop back to step 1420, the client device will increment the GOP counter and will retrieve the next GOP of that tile from the server 300. This means that a server request is made every 0.5 seconds or so.

If the client device 200 does establish that the user has touched the touch screen 230, the client device 200 determines whether the user has touched (that is, selected) an indicated point in step 1425. If the user has selected an indicated point, the yes path is followed and the client device 200 goes to the URL for that indicated point stored in memory 225. This occurs in step 1430. The value of frame counter is stored in step 1435 so that should the user wish to return to the application, the client device 200 will retrieve the last frame from the server 300. It is optional whether the value of the tile is also stored, or whether the client device 200 starts from the initial tile should a user return to the application.

Additionally, although not specifically shown in the Figure, the client device 200 stores the co-ordinates of the view shown to the user of the client device 200. In other words, the client device 200, for each frame, stores the co-ordinates of the dotted boxes shown in FIGS. 4-6. This zoom, pitch, yaw data may be uploaded to the server 300 and, if uploaded, this is stored in the user database 310. The co-ordinate data is analysed to determine for each user, their preferred view as well as any occasions where the indicated points were displayed to the user. This enables any advertising revenue to be collected from advertisers. The process will then end in step 1445. Additionally, the co-ordinate data may be used to generate user driven metadata such as generating a pseudo-broadcast feed defined as the average of the views being watched.

Returning to step 1425, if the user has not selected an indicated point, the "no" step is followed. In other words, the user has changed the view displayed on the client device 200. So, the co-ordinates of the moved dotted box are calculated according to amount of movement provided by the user during the swipe or the pinch to zoom. This is step 1450. The user in this step effectively changes the zoom of the virtual camera (with the pinch to zoom) and the pitch and yaw of the virtual camera (with the swipe).

The co-ordinates of the moved dotted box are then stored in step 1455.

The client device 200 then determines whether a new tile is needed in step 1460.

If a new tile is needed, the yes path is followed. The client device 200 in step 1465 then adds the value of the frame counter into the URL of the tile from the memory 225. The client device 200 then requests the tile from the server 300 in step 1475.

The client device 200 then extracts the view from the received tile. In other words, the client device 200 extracts the content of the dotted box from the received tile and displays this on the display of the client device. This is step 1480.

The client device 200 then determines whether the user wishes to quit the application by closing the application or pressing an appropriate icon on the touch screen. If the user does not wish to quit the application, the client device 200 returns to step 1425.

Alternatively, if the user does decide to quit the application the coordinates of dotted box during the user's viewing experience are uploaded to the server 300 similarly to that described with reference to steps 1440. Optionally, the frame counter may be stored to allow a user to return to the same frame and/or the tile may also be stored.

The process ends at step 1495.

Returning to step 1460, if a new tile is not required, the no path is followed. The client device 200 then extracts the view from the current tile. In other words, the client device 200 extracts the content of the dotted box from the current tile and displays this on the display of the client device. This is step 14951. The client device 200 then determines whether the user wishes to quit the application by closing the application or pressing an appropriate icon the touch screen. If the user does not wish to quit the application, the client device 200 returns to step 1450.

Alternatively, if the user does decide to quit the application the coordinates of dotted box during the user's viewing experience are uploaded to the server 300 similarly to that described with reference to step 1440. Optionally, the frame counter may be stored to allow a user to return to the same frame and/or the tile may also be stored.

Variations of the Embodiments

Obviously, the above is a non-limiting example and the scope of protection should be in no way limited to the example.

Although the above is described with reference to certain shapes of tiles, the disclosure is no way limited to this. In fact, although rectangular shaped tiles are described other shapes are envisaged. For example, in GB1306050.4 filed on 4 Apr. 2013 and also in GB1316102.1 filed 10 Sep. 2013 a method for applying perspective correction to a view of a panoramic scene is described. The entire content of this disclosure is hereby incorporated by reference. In particular, at least the section in this previous application describing the perspective correction is incorporated. In this example, the perspective correction may be applied to the entire image 400. The rectangular tiles may then be applied to the perspective corrected image 400. Alternatively, if the image 400 does not have the perspective correction applied thereto, the shape of the tile may be selected to apply the perspective correction thereto. Additionally, if the image 400 is not perspective corrected, and the tile shape is rectangular, then the client device 200 may perform the perspective correction knowing the co-ordinates of the view (i.e. the dotted box) using the techniques described in GB1306050.4 filed on 4 Apr. 2013 and also in GB1316102.1 filed 10 Sep. 2013.

Additionally, the server 300 may be configured to map the image 400 onto a non-rectilinear surface. In this case, the client 200 may then only supply the co-ordinates of the view required. The server 300 can then extract the view at the required co-ordinates (which is a rectangular cut-out) and provide this via the Internet. This allows the client device 200 to have very low processing power such as a set-top box and as the server 300 is only performing a rectangular cut-out of the mapped image (which is very low on processing power), the number of client devices 200 requesting these views is scalable.

Obviously, numerous modifications and variations of the present disclosure are possible in light of the above teachings. It is therefore to be understood that within the scope of the appended claims, the disclosure may be practiced otherwise than as specifically described herein.

In addition to the above, further embodiments are envisaged.

Further Embodiment 1

In some implementations of the client device 200 described above, the GPU 215 may be capable of decoding a plurality of images or image streams at any one time. For example, the GPU 215 may be capable of simultaneously decoding two or more high definition streams. In this instance, it is possible to increase the speed of scrolling across the stitched image using this at least one further decoding capability. This will be explained with reference to FIG. 15.

In the previously described embodiment, the image was split in several overlapping tiles. In the example shown in FIG. 7E, the image was split into 6 tiles named Tile A3 -F3, These tiles overlapped so that as the user scrolled along the screen, say from left to right in FIG. 7E, tile A3 was retrieved and decoded and stored in memory as the user was located in section 710 then as the user moved into section 715, tile B3 was retrieved and decoded and stored in memory so that should the user continue moving to the right, no buffering would be required and the user could smoothly move across the screen.

Figure 15:
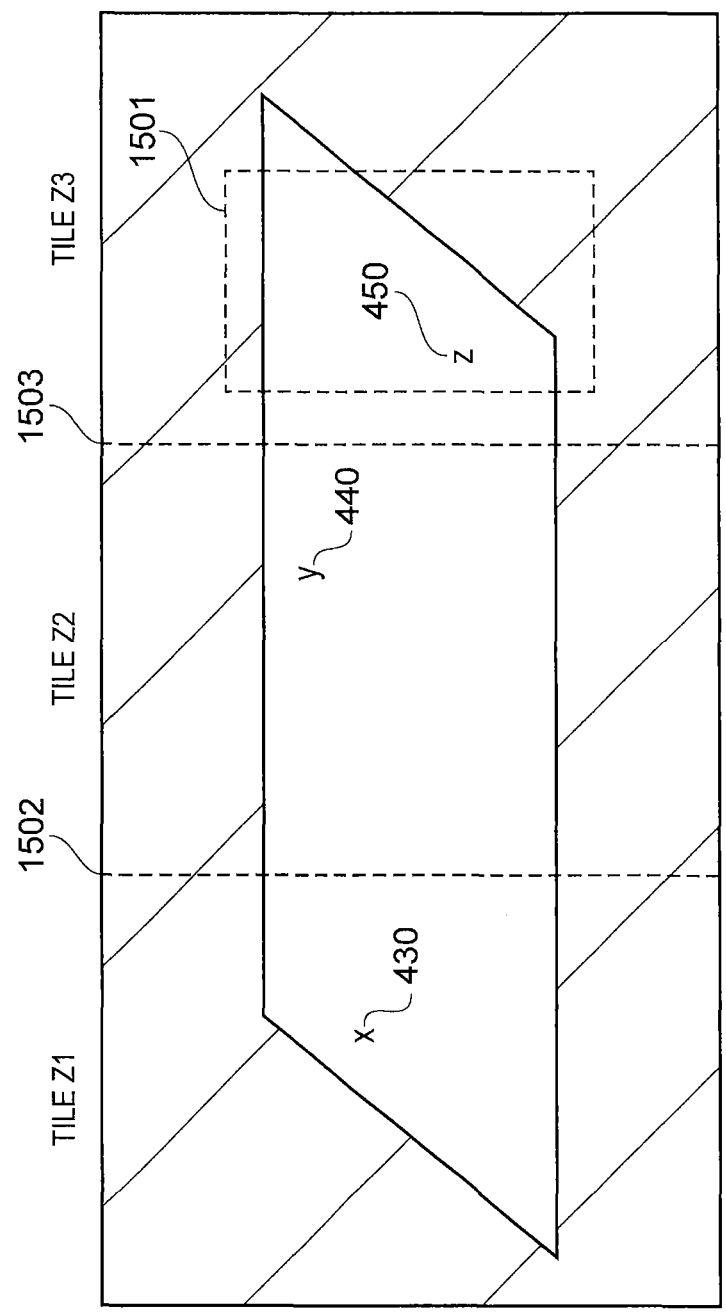
FIG. 15 shows a tile arrangement according to Further Embodiment 1.

However, this arrangement can be improved. Firstly, as a tile has to be retrieved and decoded whilst the user is position in the area of overlap, the scrolling speed is limited. This is because the entire tile to which the user is moving has to be retrieved and decoded in the time taken for the user to scroll half the width of the previously retrieved tile (i.e. the area of overlap). Secondly, the number of tiles stored on the server is greatly increased as tiles include areas of overlap with other tiles. The further embodiment 1 will be described now which aims to alleviate these problems. It should be noted that the previous features of the described embodiment, with the exception of the inclusion of the capability to simultaneously decode two or more images or video streams, will apply to this further embodiment 1. Referring to FIG. 15, the scene of FIG. 4 is shown with points X 430, Y 440 and Z 450 marked. Contrary to the previously described embodiment however, the scene is split into three non-overlapping tiles, Z1, Z2 and Z3. Each edge of the tile that adjoins the adjacent tile is called a boundary edge hereinafter. In FIG. 15, the boundary edge of tile Z3 is marked as line 1503 and the boundary edge of tile Z1 is marked as 1502. Tile Z2 has both boundary edges 1502 and 1503. Moreover, the image that will be displayed on the display 235 of the client device 200 is shown as dotted line 1501. In this embodiment, each tile is in high definition resolution (i.e. a resolution of 1920×1080 pixels). The image that will be displayed on display 235 will be less than this, and will typically be of a resolution of 720p (i.e. 1280×720 pixels).

Further, it should be noted that in the embodiment of FIG. 15, the client device 200 is capable of decoding two images or image streams simultaneously. Specifically, the GPU 215 as shown in FIG. 2 would, for this further embodiment, be capable of decoding two images or streams of images, for example, and in this case, high definition images (i.e. images having a resolution of 1920×1080 pixels). So, in this embodiment, the view displayed on the client device 200 is of a section of tile Z3. In this embodiment, as the GPU 215 can decode two high definition images or streams of images, the adjoining tile, Z2 is also retrieved and decoded within the client device 200. In other words, tile Z3 and tile Z2 are adjacent one another and are retrieved as a pair and are decoded at the same time. Therefore, as the user scrolls to the left to view point Y 440, the decoded stream in tile Z2 will be used to display point Y 440 on the client device 200.

As the user continues to scroll to the left, the controller 220 in client device 200 must decide when to retrieve tile Z1. This is explained in FIG. 16.

Figure 16:
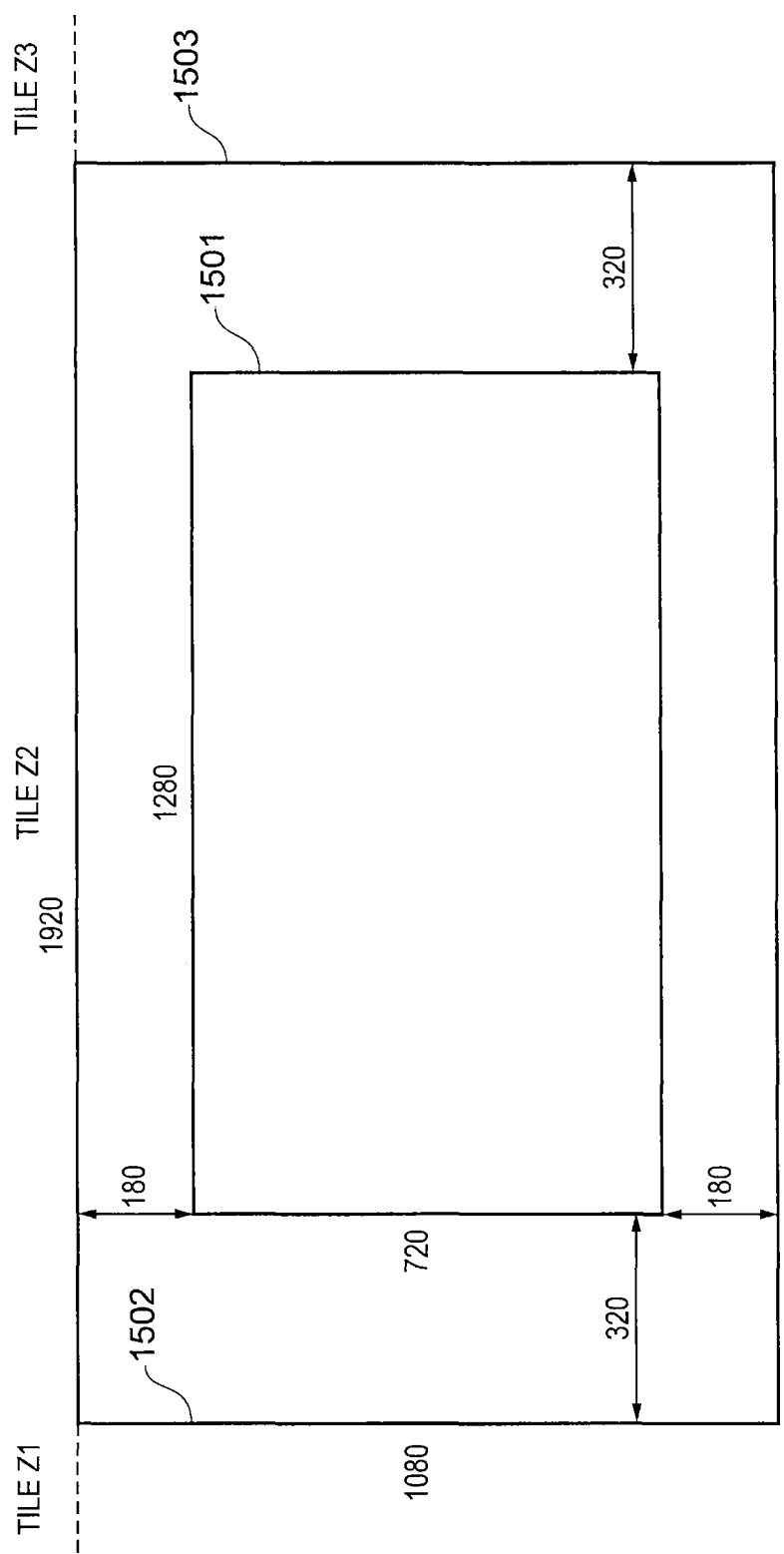
FIG. 16 shows a cutout section located within a tile of FIG. 15.

In FIG. 16, a high definition image (i.e. 1920×1080 pixels) is shown. Within the high definition image is the lower resolution 720p cutout (i.e. 1280×720 pixels) which is displayed on the user device 200. The controller 220 of the user device 200 retrieves tile Z1 when the cutout is positioned approximately half way between tile Z1 and tile Z3. In the case of the example of FIG. 16, given the dimensions of the tile and the cutout, tile Z1 is retrieved when the left hand edge of the cutout is 320 pixels from the left hand edge of tile Z2 (the current tile). In this instance, if the user continued to scroll left, controller 220 would retrieve tile Z1 from server 300. So, in this case, both tile Z2 (the current tile) and tile Z1 (the next adjacent tile) would be decoded by GPU 215.

Clearly, if the user suddenly scrolled right, then tile Z3 could be retrieved from server 300 instead of tile Z1 if the right hand edge of the cutout went closer than 320 pixels to the right hand edge of tile Z2.

In more general terms, the next tile (in the direction of scroll) is retrieved when the cutout is approximately equidistant between tiles adjacent to the current tile. This allows quicker scrolling than the previous embodiment. In the previous embodiment, the tiles were overlapped. Therefore, the next tile was retrieved when the cutout was located in the area of overlap. This meant for the same size tiles, in the previous embodiment where there was overlap, the next tile was retrieved when the cutout was closer to the edge of the tile than in further embodiment 1. In order to allow the client device to download the next tile in the previous embodiment, therefore, the effective scrolling speed of the cutout needed to be slower than in further embodiment 1.

Of course, other modifications are envisaged. For example, the above further embodiment 1 describes the case where horizontal non-overlapping tiles are retrieved. The same principles apply to vertical non-overlapping tiles. Moreover the principles are explained with the GPU 215 having two decoders. In the event that more decoders are provided in the GPU 215, the principles still apply. For example, in the event that the GPU 215 had three decoders, when the cutout is approximately equidistant between tiles adjacent the current tile (i.e. tile Z2), using the GPU 215 having three decoders, both adjacent tiles (i.e. tiles Z1 and Z3) may be retrieved from the server 300. Therefore, both adjacent tiles may be decoded at the same time as the current tile. This is advantageous because the client device 200 needs to make no prediction about the scrolling direction of the user as both tiles adjacent the current tiles are being decoded anyway.

Although the above further embodiment 1 describes the tiles being dimensioned as high definition images and the cutout being of 720p dimensions, the principles of the present disclosure still apply to any sized tiles and cutouts as would be appreciated.

Further Embodiment 2

Figure 17:
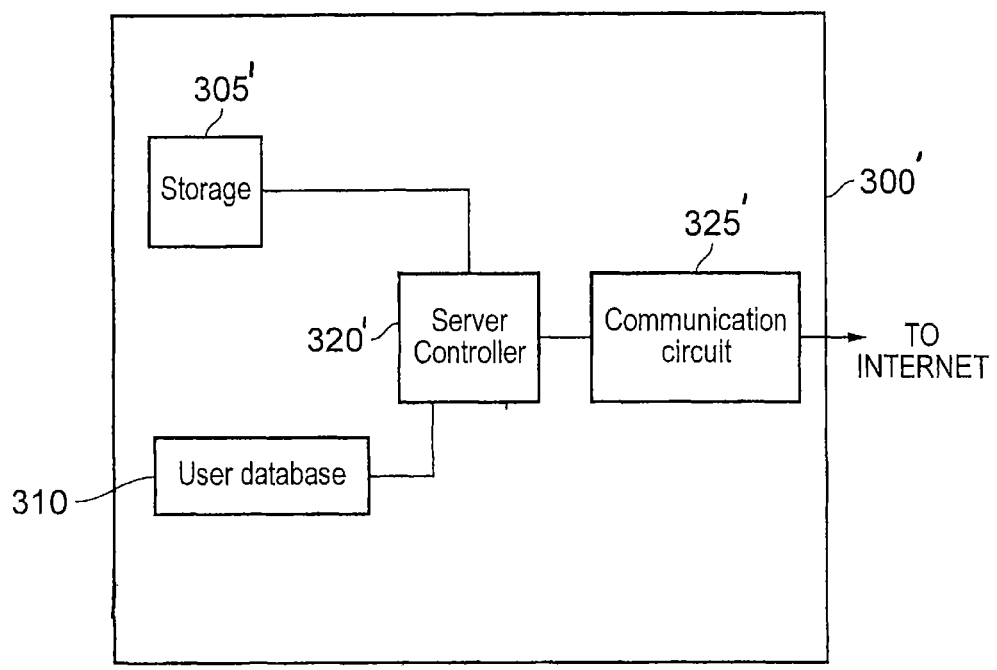
FIG. 17 shows a server according to Further Embodiment 2.

The above embodiments describe a system in which individual tiles or adjacent tiles are retrieved from the server 300. This requires the client device 200 to request tiles at an appropriate time from the server 300. Whilst this is a practical solution, in some instances, it is desirable that the client device 200 simply receives the tiles without having to request them. Such an example would be in a multicast network. A multicast network is a network in which the same content is pushed to each client device at the same time. A server 300' for a multicast network is shown in FIG. 17. Some of the features of server 300' are similar or the same as for server 300 in FIG. 3.

In the server 300' storage 305' is provided. Unlike the server 300 of FIG. 3, stored within the storage 305' is a collage of video tiles. The collage of video tiles will be explained later. Additionally, and similar to the storage in FIG. 3, other video streams may be stored in the storage 305'. Moreover, advertisements or still images, or indeed any content may be stored in the storage 305'. The storage 305' may be solid state memory, or magnetic or optical readable storage or a combination thereof.

Of course, the storage 305' may not be necessary. For example, in some instances, the collage may be formed of live video which is not stored in storage 305'. In this case, live images may be captured and then re-ordered to form the video collage by a server controller 320'. The video collage formed of live images then may or may not be stored. In other words, the server controller 320' may form the video collage from the captured live video/images and this video collage formed of the live streams may be multicast to the client devices over the network.

A server controller 320' is provided. The server controller 320' is a processor that controls the operation of the server 300'. Further, the server controller 320' performs image processing to generate the image tiles (or segments) stored within the storage 305' as well as the collage of video tiles. The server controller 320' generates the video tiles in the same manner described with reference to FIG. 3 and is controlled using a computer program similar to the controller 320 of FIG. 3.

Also connected to the server controller 320' is a user database 310. The user database 310 is similar to that of FIG. 3 and stores details about the users connected to the server 300 such as IP addresses of the users in which to send the video collage. This will be explained later. As the same content is multicast to all users, there is no requirement for the video database 315 in the server 300' of FIG. 17.

Also connected to the server controller 320' is a communication circuit 325'. The communication circuit 325 connects the server 300 to the Internet 110 or a network in which a plurality of client devices 200' are also connected. The communication circuit 325 sends the video collage to the client device 200' in a multicast manner as will be described.

Figure 18:
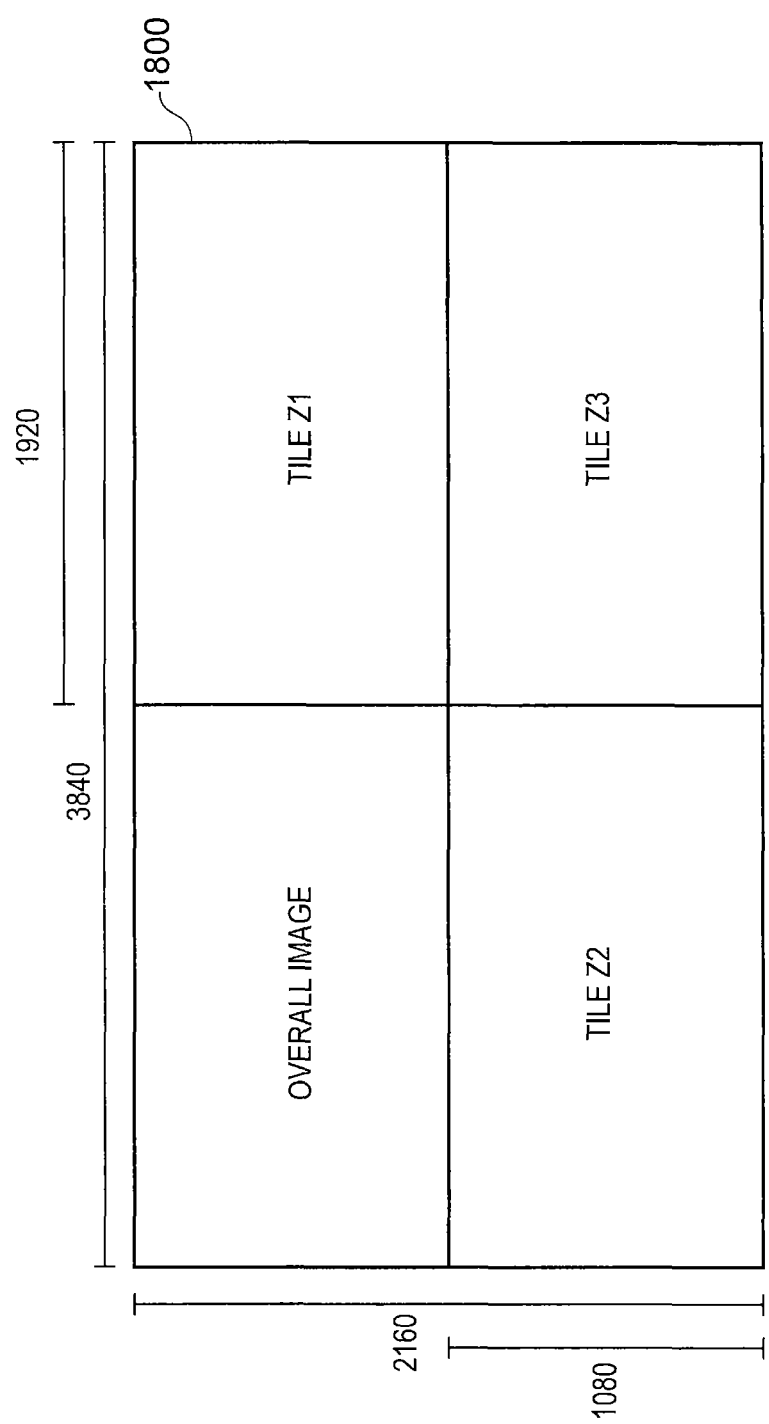
FIG. 18 shows a tile arrangement according to Further Embodiment 2.

The video collage 1800 generated in server 300' will now be described with reference to FIG. 18. The video collage 1800 consists of four tiles; three of the tiles Z1, Z2 and Z3 are the same as shown in FIG. 15 and the fourth tile is a lower resolution image of the entire scene. In other words, in FIG. 15, tiles Z1, Z2 and Z3 are different segments of a scene which together form the overall scene and the fourth tile is a lower resolution representation of the overall scene. These four tiles are arranged in a 2×2 tile arrangement which is the video collage 1800. So, the four tiles are formed into one 2×2 video collage 1800. As would be appreciated by the skilled person, and as noted earlier, each tile is a high definition image (i.e. having a resolution of 1920×1080 pixels). Thus, the 2×2 video collage 1800 has an overall resolution of 3840×2160 pixels. The 2×2 video collage thus forms a single 4 k image or video stream. By arranging the tiles in this manner allows the same single 4 k image to be multicast to a plurality of client devices. The client devices need only then decode the single 4 k image and display the relevant cutout from the single 4 k image to the user of the client device. A client device for use in the multicast system is shown in FIG. 19.

Figure 19:
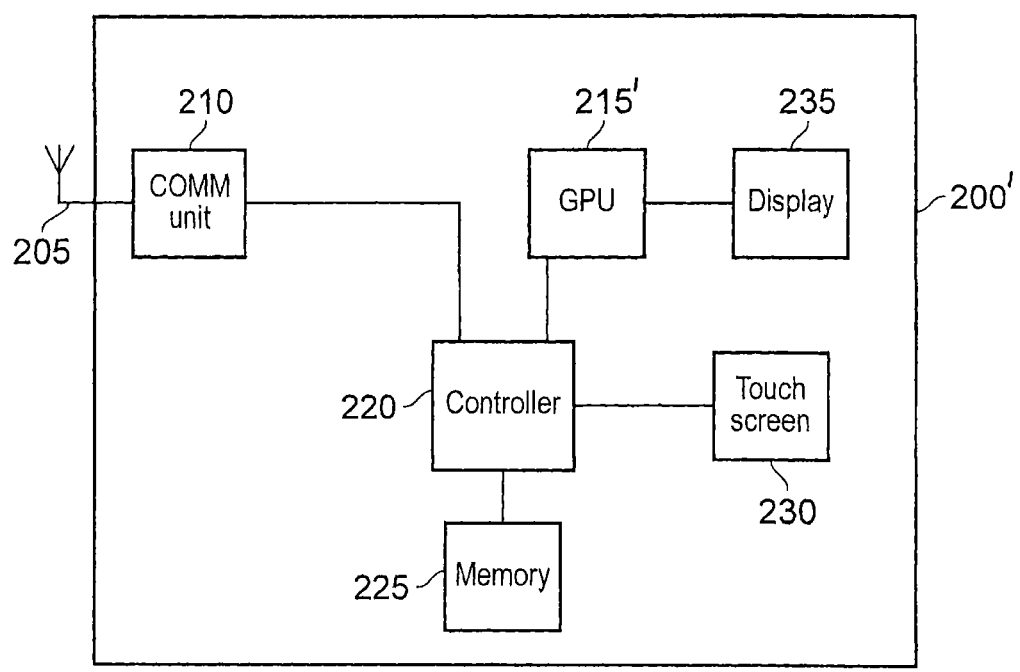
FIG. 19 shows a client device according to Further Embodiment 2.

The client device 200' in FIG. 19 has many similar features to the client device 200 in FIG. 2. Where features are similar or the same, these will not be described in any detail. The main difference between the client device 200' of FIG. 19 and that of FIG. 2 is that the GPU 215' in the client device 200' of FIG. 19 is a single 4 k decoder rather than a single (or multiple) high definition decoder. Of course, it is envisaged that the single 4 k decoder in this embodiment could be replaced by a plurality of 4 k decoders allowing the principles and advantages of "Further Embodiment 1" to be realised.

Figure 20:
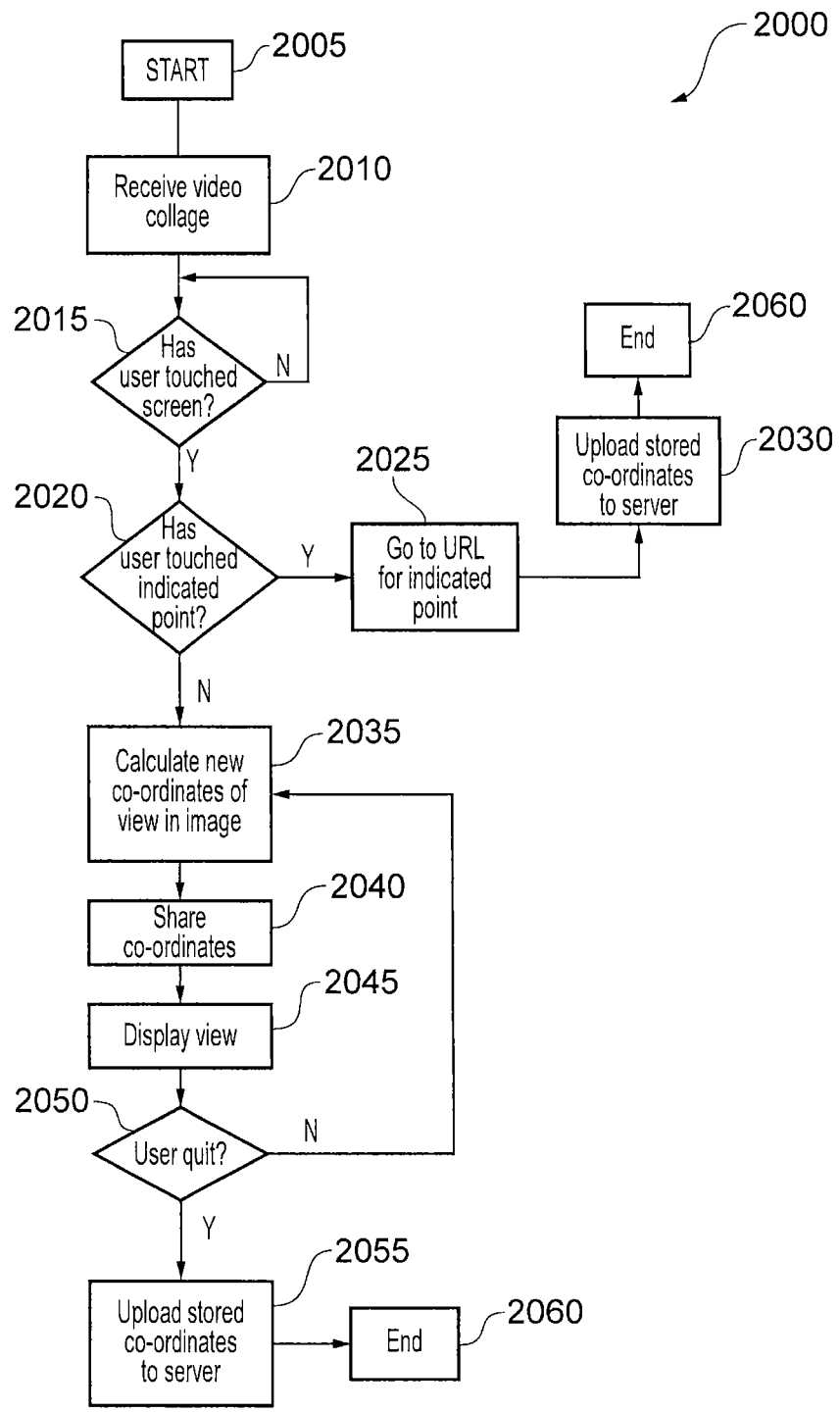
FIG. 20 shows a flow chart explaining the operation of the client device of FIG. 19 according to one exemplary embodiment.

FIG. 20 shows a flowchart explaining the operation of the client device 200' when the viewer is about to watch the content. This is different to the disclosure of FIG. 14, although any like features will be noted. As explained above in reference to FIG. 13, the client device 200' should retrieve a tile map from the server prior to watching the content. The tile map in the multicast case associates different zoom, pitch and yaw values to pixel co-ordinates within the video collage 1800 rather than to specific URLs as in the embodiment of FIG. 11. This is because only a single ultra-high definition image is received that contains the contents of all tiles.

After the tile map is retrieved and stored in memory 225, the process 2000 of FIG. 20 starts at step 2005. The video collage 1800 is retrieved at step 2010. The video collage 1800 is retrieved by the communications unit 210 in the client device 200'. The process moves to step 2015 where it is determined whether the user has touched the screen 230. If the user has not touched the screen the process 2000 waits until the user does touch the screen 230.

After the user has touched the screen, the process moves to step 2020. In step 2020, it is determined whether the user has touched an indicated point. Similar to FIG. 14, if the user does touch an indicated point, the yes path is followed and the client device 200' goes to the URL for that indicated point stored in memory 225. This occurs in step 2025. An identifier of the frame (such as a frame counter) may be stored so that should the user wish to return to the application, the client device 200' can store the decoded video collage in memory 225 and can continue viewing the feed if the user decides to return to the application.

Additionally, although not specifically shown in the Figure and similarly to FIG. 14, the client device 200', in one exemplary embodiment, stores the co-ordinates of the view shown to the user of the client device 200'. In other words, the client device 200', for each frame, stores the co-ordinates of the view shown to the user. This zoom, pitch, yaw data may be uploaded to the server 300 in step 2030 and, if uploaded, this is stored in the user database 310. The co-ordinate data is analysed to determine for each user, their preferred view as well as any occasions where the indicated points were displayed to the user. This enables any advertising revenue to be collected from advertisers. The process will then end in step 2060. Additionally, the co-ordinate data may be used to generate user driven metadata such as generating a pseudo-broadcast feed defined as the average of the views being watched. Of course, although this is possible in a multicast system where a user may register with the system before watching the multicast content, typically, there is no upload channel in a multicast system. In other words, in another exemplary embodiment of Further Embodiment 2, there is no uploading of the co-ordinate data to the server. This other exemplary embodiment will be explained with reference to FIG. 21.

Returning to step 2020 of FIG. 20, if the user has not selected an indicated point, the "no" step is followed. In other words, the user has changed the view displayed on the client device 200'. So, the co-ordinates of the moved dotted box are calculated according to amount of movement provided by the user during the swipe or the pinch to zoom. This is step 2035. The user in this step effectively changes the zoom of the virtual camera (with the pinch to zoom) and the pitch and yaw of the virtual camera (with the swipe).

The co-ordinates of the moved dotted box are then stored in step 2040 and the view is displayed to the user of the client device 200' in step 2045. The view will be taken from the video collage 1800. Specifically, the client device 200' will identify the pixels in the video collage 1800 using the zoom, pitch and yaw values in the tile map and will display these to the user.

The process then determines whether the user has quit the application in step 2050. If the user has not quit, the "no" path is followed and the process returns to step 2035. If however the user has quit, the "yes" path is followed and the process moves to step 2055 where the stored co-ordinates are uploaded to the server 300' before the application and process ends at step 2060.

As explained above, it is possible that in the multi-cast scenario there is a further exemplary embodiment in which there is no upload channel between the client device and the server. This is explained in FIG. 21. As would be appreciated, many of the features of FIG. 20 are present in FIG. 21. Where the features are the same, the same reference numeral is used. The detailed description of such like features will be omitted for brevity.

Figure 21:
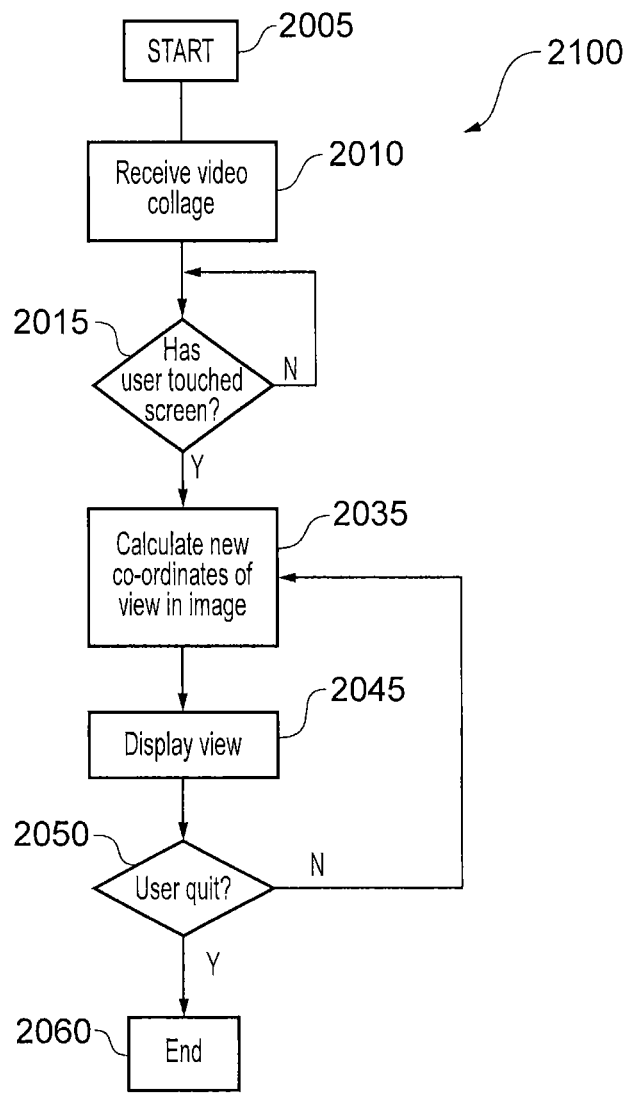
FIG. 21 shows a flow chart explaining the operation of the client device of FIG. 19 according to another exemplary embodiment.

The flowchart 2100 of the process of the client device according to the other exemplary embodiment of Further Embodiment 2 is explained with reference to FIG. 21.

The process starts at step 2005. The video tile map and collage is received by the client device in step 2010. The client device then determines whether the user has touched the screen in step 2015. If the user has touched the screen, the new co-ordinates of the view in the image is determined in step 2035. If the user has not touched the screen, the client device waits until the user has touched the screen.

After the new co-ordinates have been calculated, the view is displayed in step 2045. The client device determines whether the user has quit the application in step 2050. If the user has not quit, the process returns to step 2035. If, however, the user does quit, the yes path is followed and the process ends at step 2060.

Of course, although the above has been explained with reference to tiles Z1, Z2 and Z3 and an overall scene, the video collage is not so limited. Any number of tiles may be used to form a video collage. The video collage may include any combination of tiles. Indeed, the video collage may include a combination of video tiles and blank spaces. Moreover, the above indicates tiles which form a larger overall scene captured at the same time. In this arrangement, the tiles may be of the same section of the scene captured at different times. Further, the tiles may be any video stream and may not be of the same scene at all. It is possible that the contents of each tile is a video stream of highlights of, say a soccer match, which are to be displayed to a user. The user can then select the appropriate video stream (tile) from a menu. Further, although the above describes images as being 4 k resolution and each stream being High Definition resolution, the disclosure is in no way limited to this. Specifically, the images could be 8 k resolution, 16 k resolution or any kind of resolution. Similarly, the tiles may be 4 k resolution or more, and the number of tiles in the image may be more than or less than 4.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

Embodiments of the present disclosure can be generally referred to with the following clauses.

1. A client device, comprising:
a communication unit configured to receive a plurality of parameters, the parameters defining segments of an image stored on a server, wherein the segments do not overlap;
a processing unit configured to allow selection of a segment of the image in accordance with a defined view on the client device and wherein upon selection the segment and an adjacent segment are downloadable from the server;
a plurality of the decoders operable to decode the segment and the adjacent segment and
a display configured to display on the client device the cut out of the image taken from the segment.
2. A device according to clause 1, wherein the plurality of segments are the same size.
3. A device according to either clause 1 or clause 2, wherein the plurality of segments are high definition images.
4. A device according to any one of clauses 1, 2 or 3, wherein the resolution of the plurality of segments is less than the resolution of the image.
5. A device according to any one of clauses 1 to 4 wherein the cut-out is defined using the same parameters as those used to define the segments and the processing unit is further operable to select the segment by comparing the value of the parameters of the cut-out with the value of the parameters of the segment and selecting the segment having the closest value to that of the cut-out.
6. A device according to any one of clauses 1 to 5 further comprising a storage unit configured to store the parameters of the cut out of the image, and to return the stored parameters to the server via the communication unit.
7. A device according to clause 6, comprising charging advertising revenue on the basis of the returned parameters
8. A device according to any one of clauses 1 to 7 wherein the segment is defined by a Unique Resource Identifier identifying the location of the segment and a time identifier uniquely identifying the Group of Pictures of the segment required for download.
9. A device according to any one of clauses 1 to 8 wherein when the defined view is smaller than the segment and is approximately equidistant between boundary edges of the segment, the adjacent tile is retrieved.
10. A device according to clause 9, wherein the adjacent tile is selected based on the direction of movement of the defined view within the segment.
11. A device according to any one of clauses 1 to 10 wherein the communication unit is further configured to receive, at the client device, parameters of a second set of segments containing a different number of segments of the image, and to select the segment of the image from either the first or second set of segments in accordance with the defined view on the client device.
12. A server comprising:
a communication unit configured to send, to a client device, a plurality of parameters, the parameters defining segments of an image stored on the server, wherein the segments do not overlap; and
a processing unit configured in use to receive, via the communication unit, a request for a selected segment and an adjacent segment of the image in accordance with a defined view on the client device and, in use, uploading the segment and the adjacent segment of the image to the client.
13. A server according to clause 12, wherein the plurality of segments are the same size.
14. A server according to either one of clauses 12 or 13, wherein the plurality of segments are high definition images.
15. A server according to any one of clauses 12 to 14, wherein the resolution of the plurality of the segments is less than the resolution of the image.
16. A server according to any one of clauses 12 to 15 wherein the defined view uses the same parameters as those used to define the segments and the processing unit is further configured to: select the segment by comparing the value of the parameters of the defined view with the value of the parameters of the segment and selecting the segment having the closest value to that of the defined view.
17. A server according to any one of clauses 12 to 16 further wherein the communication unit is configured to receive the parameters of the desired view from the client device.
18. A server according to clause 17, comprising charging advertising revenue on the basis of the returned parameters
19. A server according to any one of clauses 12 to 18 wherein the segment is defined by a Unique Resource Identifier identifying the location of the segment and a time identifier uniquely identifying the Group of Pictures of the segment required for upload.
20. A server according to any one of clauses 12 to 19 further wherein the communication unit is configured to send, to the client device, parameters of a second set of segments containing a different number of segments of the image, and to send the segment of the image from either the first or second set of segments in accordance with the defined view on the client device.

21. A method, comprising:
receiving, at a client device, a plurality of parameters, the parameters defining segments of an image stored on a server, wherein the segments do not overlap;
allowing selection of a segment of the image in accordance with a defined view on the client device and wherein upon selection the segment and an adjacent segment are downloadable from the server;
decode the segment and the adjacent segment in a plurality of decoders and
displaying on the client device the cut out of the image taken from the segment.

22. A method according to clause 21, wherein the plurality of segments are the same size.

23. A method according to either clause 21 or clause 22, wherein the plurality of segments are high definition images.

24. A method according to any one of clauses 21, 22 or 23, wherein the resolution of the plurality of the segments is less than the resolution of the image.

25. A method according to any one of clauses 21 to 24 wherein the cut-out is defined using the same parameters as those used to define the segments and the processing unit is further operable to select the segment by comparing the value of the parameters of the cut-out with the value of the parameters of the segment and selecting the segment having the closest value to that of the cut-out.

26. A method according to any one of clauses 1 to 5 further comprising storing the parameters of the cut out of the image, and to return the stored parameters to the server.

27. A method according to clause 26, comprising charging advertising revenue on the basis of the returned parameters 28. A method according to any one of clauses 21 to 27 wherein the segment is defined by a Unique Resource Identifier identifying the location of the segment and a time identifier uniquely identifying the Group of Pictures of the segment required for download.

29. A method according to any one of clauses 21 to 28 wherein when the defined view is smaller than the segment and is approximately equidistant between boundary edges of the segment, the adjacent tile is retrieved.

30. A method according to clause 29, wherein the adjacent tile is selected based on the direction of movement of the defined view within the segment.

31. A method according to any one of clauses 21 to 30 comprising receiving, at the client device, parameters of a second set of segments containing a different number of segments of the image, and to select the segment of the image from either the first or second set of segments in accordance with the defined view on the client device.

32. A method performed on a server comprising:
sending, to a client device, a plurality of parameters, the parameters defining segments of an image stored on the server, wherein the segments do not overlap; and
receiving, a request for a selected segment and an adjacent segment of the image in accordance with a defined view on the client device; and
uploading the segment and the adjacent segment of the image to the client.

33. A method according to clause 32, wherein the plurality of segments are the same size.

34. A method according to either one of clauses 32 or 33, wherein the plurality of segments are high definition images.

35. A method according to any one of clauses 32 to 34, wherein the resolution of the plurality of the segments is less than the resolution of the image.

36. A method according to any one of clauses 32 to 35 wherein the defined view uses the same parameters as those used to define the segments and the method comprising: selecting the segment by comparing the value of the parameters of the defined view with the value of the parameters of the segment and selecting the segment having the closest value to that of the defined view.

37. A method according to any one of clauses 32 to 36 further comprising receiving the parameters of the desired view from the client device.

38. A method according to clause 37, comprising charging advertising revenue on the basis of the returned parameters 39. A method according to any one of clauses 32 to 38 wherein the segment is defined by a Unique Resource Identifier identifying the location of the segment and a time identifier uniquely identifying the Group of Pictures of the segment required for upload.

40. A method according to any one of clauses 32 to 39 further comprising sending, to the client device, parameters of a second set of segments containing a different number of segments of the image, and sending the segment of the image from either the first or second set of segments in accordance with the defined view on the client device.

41. A computer program product comprising computer readable code which, when loaded onto a computer, configures the computer to perform a method according to any one of clauses 21 to 40.

The invention claimed is:

1. A client device, comprising:
circuitry configured to:
receive a plurality of parameters, the parameters defining segments of an image stored on a server, wherein the segments do not overlap;
allow selection of a segment of the image in accordance with a defined view on the client device and wherein upon selection, the segment and one of a pair of adjacent segments are downloaded from the server based on a position of a cut out of the image taken from the segment relative to other segments, the cut out having a lower resolution than the one of the pair of adjacent segments, wherein (i) the circuitry selects a first adjacent segment adjacent from the left side of the position as the one of the pair of adjacent segments to be downloaded when a user of the client device scrolls to the left side of the position and the cut out is positioned half way between the segment adjacent and the segment, or (ii) the circuitry selects a second adjacent segment adjacent from the right side of the position as the one of the pair of adjacent segments to be downloaded when the user of the client device scrolls to the right side of the position and the cut out is positioned half way between the segment adjacent and the segment;
decode simultaneously the downloaded segment and the one of the pair of adjacent segments to generate decoded downloaded segment and one of the pair of adjacent segments at the same time; and
display on the client device the cut out of the image taken from the segment.

2. The client device according to claim 1, wherein the segments are the same size.

3. The client device according to claim 1, wherein the segments are high definition images.

4. The client device according to claim 1, wherein a resolution of the segments is less than a resolution of the image.

5. The client device according to claim 1 wherein the cut out is defined using the parameters used to define the segments and the circuitry is further operable to select the segment by comparing a value of the parameters of the cut-out with a value of the parameters of the segment and selecting the segment having the closest value to that of the cut-out.

6. The client device according to claim 1, wherein the circuitry is further configured to store the parameters of the cut out of the image, and to return the stored parameters to the server.

7. The client device according to claim 6, wherein the circuitry is further configured to upload the returned parameters to the server for the server to charge advertising revenue from advertisers based on the returned parameters.

8. The client device according to claim 1 wherein the segment is defined by a Unique Resource Identifier identifying a location of the segment and a time identifier uniquely identifying Group of Pictures of the segment required for download.

9. The client device according to claim 1 wherein the segments defined by the plurality of parameters form a first set of segments, the circuitry is further configured to receive parameters of a second set of segments containing a different number of segments of the image, and to select the segment of the image from either the first set of segments or second set of segments in accordance with the defined view on the client device.

10. A server comprising:
circuitry configured to:
send, to a client device, a plurality of parameters, the parameters defining segments of an image stored on the server, wherein the segments do not overlap; and
receive a request for a selected segment and one of a pair of adjacent segments of the image in accordance with a defined view on the client device and, in use, uploading the segment and the one of the pair of adjacent segments of the image to the client device based on a position of a cut out of the image taken from the selected segment relative to other segments, the cut out having a lower resolution than the one of the pair of adjacent segments, wherein (i) the circuitry selects a first adjacent segment adjacent from the left side of the position as the one of the pair of adjacent segments to be uploaded when a user of the client device scrolls to the left side of the position and the cut out is positioned half way between the segment adjacent and the segment, or (ii) the circuitry selects a second adjacent segment adjacent from the right side of the position as the one of the pair of adjacent segments to be uploaded when the user of the client device scrolls to the right side of the position and the cut out is positioned half way between the segment adjacent and the segment, and the selected segment and the selected one of the pair of adjacent segments being decoded simultaneously to generate decoded segment and decoded one of the pair of adjacent segments at the same time by the client device.

11. The server according to claim 10, wherein the segments are the same size.

12. The server according to claim 10, wherein the segments are high definition images.

13. The server according to claim 10, wherein a resolution of the segments is less than a resolution of the image.

14. The server according to claim 10 further wherein the circuitry is configured to receive the parameters of a desired view from the client device.

15. The server according to claim 10, wherein the circuitry is further configured to analyze the received parameters for charging advertising revenue from advertisers.

16. The server according to claim 11 wherein the segment is defined by a Unique Resource Identifier identifying a location of the segment and a time identifier uniquely identifying Group of Pictures of the segment required for upload.

17. The server according to claim 11 further wherein the segments defined by the plurality of parameters form a first set of segments, the circuitry is configured to send, to the client device, parameters of a second set of segments containing a different number of segments of the image, and to send the segment of the image from either the first set of segments or second set of segments in accordance with the defined view on the client device.

18. A method, comprising:
receiving, at a client device, a plurality of parameters, the parameters defining segments of an image stored on a server, wherein the segments do not overlap;
allowing selection of a segment of the image in accordance with a defined view on the client device and wherein upon selection, the segment and one of a pair of adjacent segments are downloaded from the server based on a position of a cut out of the image taken from the segment relative to other segments, the cut out having a lower resolution than the one of the pair of adjacent segments, wherein (i) a first adjacent segment adjacent from the left side of the position is selected as the one of the pair of adjacent segments to be downloaded when a user of the client device scrolls to the left side of the position and the cut out is positioned half way between the segment adjacent and the segment, or (ii) a second adjacent segment adjacent from the right side of the position is selected as the one of the pair of adjacent segments to be downloaded when the user of the client device scrolls to the right side of the position and the cut out is positioned half way between the segment adjacent and the segment; and
decoding simultaneously the segment and the one of the pair of adjacent segments in a plurality of decoders to generate decoded segment and decoded one of the pair of adjacent segments at the same time; and
displaying on the client device the cut out of the image taken from the segment.

19. A non-transitory computer readable medium including computer program instructions, which when executed by a computer causes the computer to perform the method of claim 18.

* * * * *